(12) United States Patent
Yoon et al.

(10) Patent No.: US 10,628,034 B2
(45) Date of Patent: Apr. 21, 2020

(54) USER TERMINAL DEVICE AND METHOD FOR CONTROLLING USER TERMINAL DEVICE THEREOF

(71) Applicant: Samsung Electronics Co., Ltd., Suwon-si, Gyeonggi-do (KR)

(72) Inventors: Yeo-jun Yoon, Suwon-si (KR); Dong-goo Kang, Seoul (KR); Ji-hyun Kim, Seongnam-si (KR); Ji-yeon Kwak, Seoul (KR); Hyun-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 14/926,507

(22) Filed: Oct. 29, 2015

(65) Prior Publication Data

US 2016/0124637 A1    May 5, 2016

(30) Foreign Application Priority Data

Nov. 3, 2014    (KR) .................. 10-2014-0151275

(51) Int. Cl.
*G06F 3/048* (2013.01)
*G06F 3/0488* (2013.01)
*G06F 1/16* (2006.01)
*G06F 3/01* (2006.01)

(52) U.S. Cl.
CPC .......... *G06F 3/04886* (2013.01); *G06F 1/163* (2013.01); *G06F 3/0488* (2013.01); *G06F 2203/0339* (2013.01); *G06F 2203/04806* (2013.01); *G06F 2203/04808* (2013.01)

(58) Field of Classification Search
CPC ..... G06F 3/04886; G06F 1/163; G06F 3/0488
See application file for complete search history.

(56) References Cited

U.S. PATENT DOCUMENTS

| 7,148,875 | B2* | 12/2006 | Rosenberg | .............. | A63F 13/06 |
|   |   |   |   |   | 345/156 |
| 7,339,580 | B2* | 3/2008 | Westerman | ........... | G06F 3/0485 |
|   |   |   |   |   | 345/173 |
| 7,656,393 | B2 | 2/2010 | King et al. |   |   |

(Continued)

FOREIGN PATENT DOCUMENTS

| CN | 101166330 A | 4/2008 |
| CN | 101609383 A | 12/2009 |

(Continued)

OTHER PUBLICATIONS

European Summons to Attend Oral Proceedings dated May 21, 2019, issued in European Application No. 15858005.0.

(Continued)

*Primary Examiner* — Nicholas Augustine
(74) *Attorney, Agent, or Firm* — Jefferson IP Law, LLP

(57) ABSTRACT

A user terminal device and a controlling method thereof are provided. The user terminal device includes a touch screen configured to display a keyboard user interface (UI), a detector disposed at a bezel area of the user terminal device and configured to detect a user interaction, and a controller configured to, in response to detecting the user interaction at the bezel area of the user terminal device, change properties of the keyboard UI according to the user interaction detected at the bezel area.

20 Claims, 51 Drawing Sheets

(56) References Cited

U.S. PATENT DOCUMENTS

| | | | |
|---|---|---|---|
| 7,978,181 B2* | 7/2011 | Westerman | G06F 3/0219 |
| | | | 178/17 C |
| 8,044,937 B2 | 10/2011 | Shin et al. | |
| 8,860,674 B2 | 10/2014 | Lee et al. | |
| 9,459,788 B2 | 10/2016 | Kang et al. | |
| 9,471,216 B2 | 10/2016 | Lee et al. | |
| 2008/0096610 A1* | 4/2008 | Shin | G06F 3/04886 |
| | | | 455/566 |
| 2009/0153438 A1* | 6/2009 | Miller | G06F 3/0488 |
| | | | 345/55 |
| 2009/0295753 A1* | 12/2009 | King | G06F 3/03547 |
| | | | 345/174 |
| 2010/0219943 A1* | 9/2010 | Vanska | G06F 1/163 |
| | | | 340/407.1 |
| 2011/0157046 A1 | 6/2011 | Lee et al. | |
| 2011/0209098 A1* | 8/2011 | Hinckley | G06F 3/0483 |
| | | | 715/863 |
| 2011/0242138 A1* | 10/2011 | Tribble | G06F 3/04886 |
| | | | 345/663 |
| 2012/0159386 A1 | 6/2012 | Kang et al. | |
| 2015/0012877 A1 | 1/2015 | Lee et al. | |
| 2015/0160849 A1* | 6/2015 | Weiss | G06F 3/044 |
| | | | 345/174 |
| 2015/0288795 A1* | 10/2015 | Park | G06F 3/0485 |
| | | | 455/566 |
| 2015/0339049 A1* | 11/2015 | Kasemset | G06F 3/04883 |
| | | | 715/728 |
| 2016/0070338 A1* | 3/2016 | Kim | G06F 3/0488 |
| | | | 345/173 |
| 2016/0283181 A1* | 9/2016 | Jung | G06F 3/1446 |
| 2017/0003867 A1 | 1/2017 | Lee et al. | |

FOREIGN PATENT DOCUMENTS

| | | |
|---|---|---|
| CN | 102117178 A | 7/2011 |
| CN | 102609183 A | 7/2012 |
| CN | 102754050 A | 10/2012 |
| EP | 2 469 388 A2 | 6/2012 |
| EP | 2 485 134 A1 | 8/2012 |
| KR | 10-2012-0034513 A | 4/2012 |
| WO | 2007/103631 A2 | 9/2007 |
| WO | 2011/103219 A2 | 8/2011 |
| WO | 2013/051762 A1 | 4/2013 |

OTHER PUBLICATIONS

Chinese Office Action dated Sep. 2, 2019, issued in Chinese Application No. 201580059799.4.

* cited by examiner

USER TERMINAL DEVICE AND METHOD FOR CONTROLLING USER TERMINAL DEVICE THEREOF

CROSS-REFERENCE TO RELATED APPLICATION(S)

This application claims the benefit under 35 U.S.C. § 119(a) of a Korean patent application filed on Nov. 3, 2014 in the Korean Intellectual Property Office and assigned Serial number 10-2014-0151275, the entire disclosure of which is hereby incorporated by reference.

TECHNICAL FIELD

The present disclosure relates to a user terminal device and a controlling method thereof. More particularly, the present disclosure relates to a user terminal device which controls a keyboard user interface (UI) through a user interaction of a bezel area and a controlling method thereof.

BACKGROUND

Recently, various user terminal devices have been provided. In particular, a wearable user terminal device such as a smart watch which a user can wear and manipulate has been provided. Such a wearable user terminal device has excellent mobility as a user can carry the device all the time, but may cause inconvenience due to its small touch screen.

Specifically, it is difficult for a user to input texts through a wearable user terminal device which has a small touch screen. In particular, as the size of the touch screen is small, a keyboard user interface (UI) for inputting texts is also small, which slows down the speed of inputting texts and increases the possibility of touching incorrect text keys when inputting texts. In addition, as a keyboard UI and texts input by a user are displayed simultaneously on the small touch screen, readability may also be compromised.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal device which allows a user to input texts smoothly by changing the properties of a keyboard user interface (UI) and inputting texts using a user interaction of a bezel area, and a controlling method thereof.

In accordance with an aspect of the present disclosure, a user terminal device is provided. The user terminal device includes a touch screen configured to display a keyboard UI, a detector disposed at a bezel area of the user terminal device and configured to detect a user interaction, and a controller configured to, in response to detecting the user interaction at the bezel area of the user terminal device, change properties of the keyboard UI according to the user interaction detected at the bezel area.

The controller, in response to detecting a touch interaction of touching one point of the bezel area that is located at a first side of the bezel area of the user terminal device, may control the touch screen to enlarge and display an area corresponding to the one point on the keyboard UI.

The controller, in response to detecting a drag interaction of touching and dragging one point of the bezel area located at a second side of the bezel area of the user terminal device, may control the touch screen to adjust transparency of the keyboard UI according to a direction of the drag interaction.

The controller, in response to detecting a drag interaction of touching two points of the bezel area are located at two sides of the bezel area of the user terminal device and dragging the touched two points of the bezel area in the same direction, may change an input mode of the keyboard UI according to a direction of the drag interaction.

The controller, in response to detecting a drag interaction of touching two points of the bezel area that are located at a left side and a right side of the bezel area of the user terminal device while a text is displayed on the touch screen and dragging the touched two points of the bezel area in the same direction, may select a text corresponding to an area where the drag interaction is detected.

The controller, in response to detecting a pinch interaction of touching two points of the bezel area that are located at two adjacent sides of the bezel area of the user terminal device after a text corresponding to an area where the drag interaction is detected and performing a pinch-out or a pinch-in, may copy or paste the selected text according to the pinch interaction.

The controller, in response to detecting a drag interaction of touching one point of the bezel area that is located at a first side of the bezel area of the user terminal device, and touching and dragging one point of the bezel area that is located at a second side of the bezel area of the user terminal device, may control the touch screen to change an exposure area of the keyboard UI according to a direction of the drag interaction.

The controller, in response to detecting a pinch interaction of touching two points of a bezel area that are located at a first side of the bezel area of the user terminal device and performing a pinch-out or a pinch-in, may control the touch screen to enlarge or reduce the keyboard UI according to the pinch interaction.

The controller, in response to detecting the user interaction in the bezel area, may change at least one of a language displayed on the keyboard UI, a text input method and a text display method according to the user interaction.

The controller, in response to detecting a touch interaction of touching a predetermined area of the bezel area while the keyboard UI is displayed, may perform a function corresponding to the predetermined area.

In accordance with an aspect of the present disclosure, a method for controlling a user terminal device is provided. The method includes displaying a keyboard UI on a touch screen and, in response to detecting a user interaction at a bezel area of the user terminal device, changing properties of the keyboard UI according to the user interaction detected at the bezel area.

The changing may include, in response to detecting a touch interaction of touching one point of the bezel area that is located at a first side of the bezel area of the user terminal device, enlarging and displaying an area corresponding to the one point on the keyboard UI.

The changing may include, in response to detecting a drag interaction of touching and dragging one point of the bezel area located at a second side of the bezel area of the user terminal device, adjusting transparency of the keyboard UI according to a direction of the drag interaction.

The changing may include, in response to detecting a drag interaction of touching two points of the bezel area that are located at two sides of the bezel area of the user terminal device and dragging the touched two points of the bezel area in the same direction, changing an input mode of the keyboard UI according to a direction of the drag interaction.

The method may include, in response to detecting a drag interaction of touching two points of the bezel area that are located at a left side and a right side of the bezel area of the user terminal device while a text is displayed on the touch screen and dragging the touched two points of the bezel area in the same direction, selecting a text corresponding to an area where the drag interaction is detected.

The method may include, in response to detecting a pinch interaction of touching two points of the bezel area that are located at two adjacent sides of the bezel area of the user terminal device after a text corresponding to an area where the drag interaction is detected and performing a pinch-out or a pinch-in, copying or pasting the selected text according to the pinch interaction.

The changing may include, in response to detecting a drag interaction of touching one point of the bezel area that is located at a first side of the bezel area of the user terminal device, and touching and dragging one point of the bezel area that is located at a second side of the bezel area of the user terminal device, changing an exposure area of the keyboard UI according to a direction of the drag interaction.

The changing may include, in response to detecting a pinch interaction of touching two points of a bezel area that are located at a first side of the bezel area of the user terminal device and performing a pinch-out or a pinch-in, enlarging or reducing the keyboard UI according to the pinch interaction.

The changing may include, in response to detecting the user interaction in the bezel area, changing at least one of a language displayed on the keyboard UI, a text input method and a text display method according to the user interaction.

The method may further include, in response to detecting a touch interaction of touching a predetermined area of the bezel area while the keyboard UI is displayed, performing a function corresponding to the predetermined area.

According to the above-described various embodiments, a user may input texts smoothly using a user terminal device with a small touch screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, relational terms such as first and second, and the like, may be used to distinguish one entity from another entity, without necessarily implying any actual relationship or order between such entities.

The terms used in the following description are provided to explain a specific embodiment and are not intended to limit the scope of rights. The terms, "include", "comprise", "is configured to", etc. of the description are used to indicate that there are features, numbers, operations, elements, parts or combination thereof, and they should not exclude the possibilities of combination or addition of one or more features, numbers, operations, elements, parts or combination thereof.

In an embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

Hereinafter, various embodiments will be described in greater detail with reference to the accompanying drawings.

Figure 1:
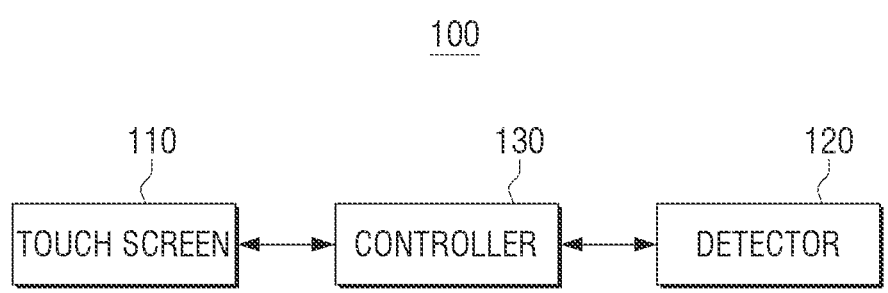
FIG. 1 is a block diagram illustrating configuration of a user terminal device briefly according to an embodiment of the present disclosure.

FIG. 1 is a block diagram illustrating configuration of a user terminal device 100 briefly according to an embodiment of the present disclosure.

Referring to FIG. 1, the user terminal device 100 includes a touch screen 110, a detector 120 and a controller 130. Meanwhile, the user terminal device 100 according to an embodiment may be a smart watch, but this is only an example. The user terminal device 100 may be realized as various user terminal devices such as smart phone, tablet personal computer (PC), notebook PC, plasma display panel (PDP), etc.

The touch screen 110 displays image data, and receives a user's touch interaction to control the user terminal device 100. In particular, the touch screen 110 may display a keyboard user interface (UI) including a plurality of text keys, and may receive a touch interaction to select one of the plurality of text keys.

Meanwhile, the touch screen 110 according to an embodiment may be configured in the form of a square, but this is only an example. The touch screen 110 may be configured not only in the form of a square but also in the form of a polygon or a circle. If the touch screen 110 is configured in the form of a polygon or a circle, a bezel area of the touch screen in the form of a polygon or a circle may be divided into four areas, and a first area of the four areas may be regarded as a first side of the touch screen in the form of a rectangle, and a second area of the four areas may be regarded as a second side of the touch screen in the form of a rectangle, which will be described in detail with reference to FIGS. 10A to 10E.

The detector 120 detects a user interaction with respect to the bezel area of the user terminal device 100. In particular, the detector 120 may detect a tap interaction of tapping the bezel area, a drag interaction of touching one point of the bezel area and dragging the touched point in a certain direction, etc. In this case, the bezel area may be one of an area where a bezel to house the touch screen 110 is located and an outer area of the touch screen 110 which is adjacent to a bezel.

The controller 130 controls the overall functions of the user terminal device 100 according to a user command which is input through at least one of the touch screen 110 and the detector 120. In particular, if a user interaction is detected on the bezel area of the user terminal device 100 through the detector 120 while a keyboard UI is displayed, the controller 130 may change the properties of the keyboard UI according to the user interaction detected on the bezel area.

Specifically, if a touch interaction of touching one point of the bezel area which is located at the first side of the bezel area of the user terminal device 100 is detected through the detector 120 while a keyboard UI is displayed on the touch screen 110, the controller 130 may control the touch screen 110 to enlarge and display an area corresponding to the touched point on the keyboard UI. For example, if a touch interaction of touching a right area of a lower side of the bezel area of the user terminal device 100 is detected, the controller 130 may control the touch screen 110 to enlarge and display at least one text key included in an area corresponding to the right area on the keyboard UI where the touch interaction is detected.

In addition, if a drag interaction of touching the bezel area which is located at the second side of the bezel area of the user terminal device 100 is detected through the detector 120 while a keyboard UI is displayed on the touch screen 110, the controller 130 may control the touch screen 110 to adjust the transparency of the keyboard UI according to the direction of the drag interaction. For example, if a drag interaction of touching one point of the bezel area corresponding to a right side of the bezel area of the user terminal device 100 and dragging the touched point in an upper direction is detected, the controller 130 may control the touch screen 110 to reduce the transparency of the keyboard UI. In another example, if a drag interaction of touching one point of the bezel area corresponding to the right side of the bezel area of the user terminal device 100 and dragging the touched point in a lower direction is detected, the controller 130 may control the touch screen 110 to increase the transparency of the keyboard UI.

Alternatively, if a drag interaction of touching two points of the bezel area which are located at two sides of the bezel area of the user terminal device 100 and dragging the touched points of the bezel area in the same direction is detected, the controller 130 may change an input mode of the keyboard UI according to the direction of the drag interaction. Specifically, if a drag interaction of touching two points of the bezel area which are located at a upper side and a lower side of the bezel area of the user terminal device 100 and dragging the touched points of the bezel area in a right direction is detected while the keyboard UI maintains an English input mode, the controller 130 may control the touch screen 110 to change the input mode of the keyboard UI from the English input mode to a Korean input mode. Meanwhile, the input mode of the keyboard UI according to an embodiment may include at least one of an English input mode, a Korean input mode, a special text input mode, and a number input mode, but this is only an example. The input mode of the keyboard UI may further include an input mode for other languages than English and Korean.

If a drag interaction of touching two points of the bezel area which are located at left and right sides of the bezel area of the user terminal device 100 while a text is displayed on a touch screen, the controller 130 may select a text corresponding to the area where the drag interaction is detected.

In addition, after a text in the area where the drag interaction is detected is selected, if a pinch interaction of touching two points of the bezel area which are located at adjacent two sides of the bezel area of the user terminal device 100 and performing a pinch-out or a pinch-in is detected, the controller 130 may copy or paste the selected text according to the pinch interaction. Meanwhile, the pinch-out interaction according to an embodiment is an interaction of touching two points and widening the distance between the two points, and the pinch-in interaction is an interaction of touching two points and narrowing down the distance between the two points.

For example, if a pinch interaction of touching two points of the bezel area which are located at a lower side and a right side of the bezel area of the user terminal device 100 and performing a pinch-in so that the touched two points become close is detected, the controller 130 may copy a selected text. Alternatively, if a pinch interaction of touching two points of the bezel area which are located at a lower side and a right side of the bezel area of the user terminal device 100 and performing a pinch-out so that the touched two points become apart is detected, the controller 130 may paste a selected text at an area where a cursor is located.

If a drag interaction of touching one point of the bezel area which is located at the first side of the bezel area of the user terminal device 100, touching one point of the bezel area which is located at the second side of the bezel area of the user terminal device 100, and dragging the touched points is detected, the controller 130 may control the touch screen 110 to change an exposure area of the keyboard UI according to the direction of the drag interaction.

In addition, if a pinch interaction of touching two points of the bezel area which is located at the first side of the bezel area of the user terminal device 100 and performing a pinch-out or a pinch-in is detected, the controller 130 may control the touch screen 110 to enlarge or reduce the keyboard UI according to the pinch interaction. For example, if a pinch interaction of touching two points of the bezel area which is located at a lower side of the bezel area of the user terminal device 100 and performing a pinch-out so that the two points become apart is detected, the controller 130 may control the touch screen 110 to enlarge the keyboard UI in a horizontal direction.

If a predetermined user interaction is detected on the bezel area, the controller 130 may change at least one of a language displayed on the keyboard UI, a text input method and a text display method according to the predetermined user interaction.

In addition, if a touch interaction of touching a predetermined area of the bezel area is detected while the keyboard UI is displayed, the controller 130 may perform a function corresponding to the predetermined area. For example, the controller 130 may perform a home screen conversion function, a delete function, a space function, an enter function, etc. according to the touched predetermined area.

As described above, a user may input a text more smoothly using the user terminal device 100 which includes a small screen through a user interaction with respect to the bezel area.

Herein after, various embodiments will be described with reference to FIGS. 2 to 16C.

Figure 2:
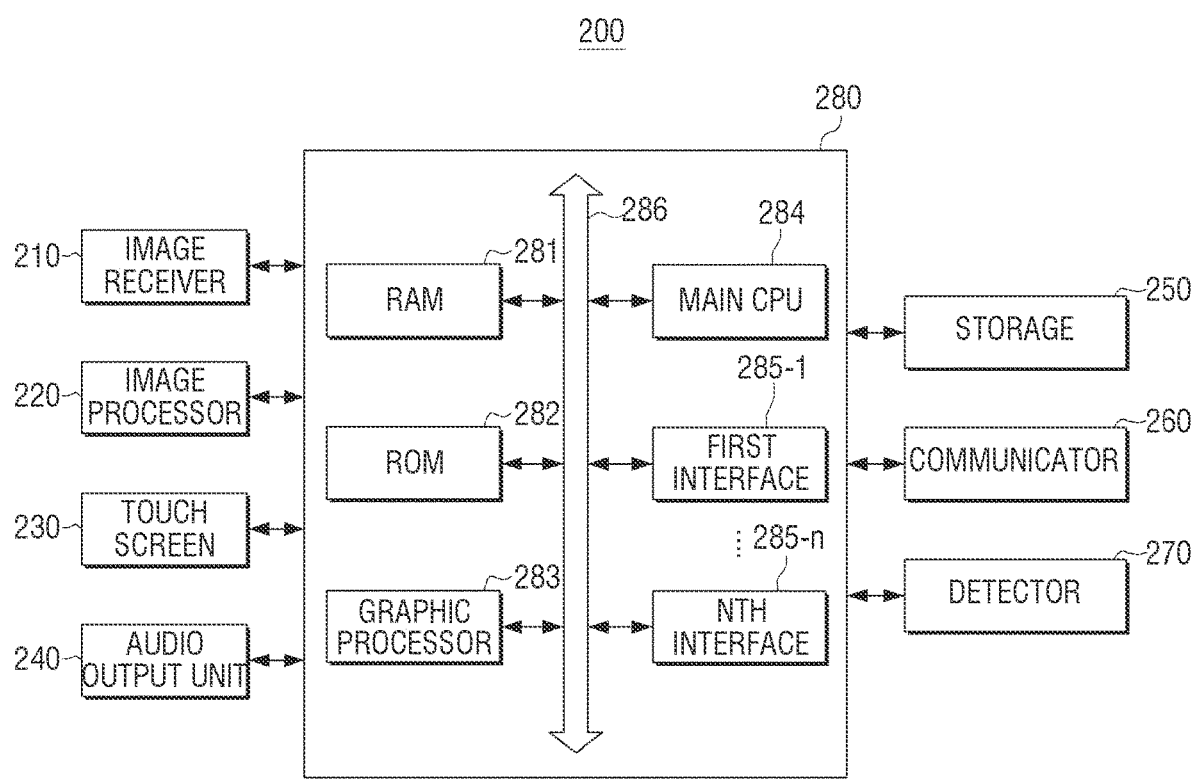
FIG. 2 is a block diagram illustrating configuration of a user terminal device in detail according to an embodiment of the present disclosure.

FIG. 2 is a block diagram illustrating configuration of a user terminal device 200 in detail according to an embodiment of the present disclosure.

Referring to FIG. 2, the user terminal device 200 includes an image receiver 210, an image processor 220, a touch screen 230, an audio output unit 240, a storage 250, a communicator 260, a detector 270, and a controller 280.

Meanwhile, FIG. 2 illustrates various elements in a comprehensive manner, assuming that the user terminal device 200 provides various functions such as a text input function, a display function, etc. Accordingly, depending on various embodiments, some of the elements illustrated in FIG. 2 may be omitted or changed, and other elements may be added.

The image receiver 210 receives image data through various sources. For example, the image receiver 210 may receive broadcast data from an external broadcasting station, receive video on demand (VOD) data from an external server in real time, or receive image data from an external apparatus.

The image processor 220 processes image data received from the image receiver 210. The image processor 220 may perform various image processing operations with respect to image data, such as decoding, scaling, noise filtering, frame rate conversion, resolution conversion, etc.

The touch screen 230 displays at least one of a video frame which is generated by processing image data received from the image receiver 210 by the image processor 220 and various screens generated by a graphic processor 283. In particular, the touch screen 230 may display a keyboard UI which includes a plurality of text keys for inputting texts. In addition, the touch screen 230 may change the properties of the keyboard UI (for example, the size, transparency, input mode, etc. of text keys) according to a user interaction which is input on the bezel area.

In addition, the touch screen 230 may detect a touch interaction to control the user terminal device 200. For example, the touch screen 230 may detect a touch interaction to select one of a plurality of text keys included in the keyboard UI.

The touch screen 230 may be housed by a bezel. In this case, the bezel may include the detector 270 which detects a user interaction to control the properties of a keyboard.

The touch screen 230 according to an embodiment may be configured in the form of a regular square, but this is only an example. The touch screen 230 may be configured not only in the form of a regular square but also in the form of a polygon or circle.

The audio output unit 240 outputs not only various audio data which has been processed by an audio processor (not shown) in various ways such as decoding, amplification, noise filtering, etc. but also various alarm sounds or voice messages. In particular, the audio output unit 240 may be realized as a speaker, but this is only an example. The audio output unit 240 may be realized as an output terminal which may output audio data.

The storage 250 stores various modules to drive the user terminal device 200. For example, the storage 250 may store software including a base module, a sensing module, a communication module, a presentation module, a web browser module, and a service module. In this case, the base module refers to a basic module which processes a signal transmitted from each hardware included in the user terminal device 200, and transmits the processed signal to an upper layer module. The sensing module is a module which collects information from various sensors, and analyzes and manages the collected information. The sensing module may include a face recognition module, a voice recognition module, a motion recognition module, and a near field communication (NFC) recognition module, and so on. The presentation module is a module to compose a touch screen. The presentation module includes a multimedia module for reproducing and outputting multimedia contents, and a UI rendering module for UI and graphic processing. The communication module is a module to perform communication with outside. The service module is a module including various applications for providing various services.

As described above, the storage 250 may include various program modules, but some of the various program modules may be omitted or changed, or new modules may be added according to the type and characteristics of the user terminal device 200. For example, if the user terminal device 200 is realized as a tablet PC, the base module may further include a location determination module to determine a global positioning system (GPS)-based location, and the sensing module may further include a sensing module to detect a user's operation.

The communicator 260 may perform communication with various external apparatuses. In particular, the communicator 260 may include various communication chips such as a Wi-Fi chip, a Bluetooth chip, an NFC chip and a wireless communication chip. Here, the Wi-Fi chip, the Bluetooth chip, and the NFC chip performs communication according to a Wi-Fi method, a Bluetooth method, and an NFC method, respectively. The NFC chip represents a chip which operates according to an NFC method which uses 13.56 MHz band among various radio-frequency identification (RF-ID) frequency bands such as 135 kHz, 13.56 MHz, 433 MHz, 860-960 MHz, 2.45 GHz, and so on. In the case of using the Wi-Fi chip or the Bluetooth chip, various connection information such as service set identifier (SSID) and a session key may be transmitted/received first for communication connection and then, various information may be transmitted/received. The wireless communication chip represents a chip which performs communication according to various communication standards such as institute of electrical and electronics engineers (IEEE), Zigbee, $3^{rd}$ Generation (3G), $3^{rd}$ generation partnership project (3GPP), long term evolution (LTE) and so on.

In particular, the communicator 260 may perform communication not only with an external server but also with other mobile user terminal devices.

The detector 270 is disposed at a bezel area which houses the touch screen 230 and detects a user interaction with respect to the bezel area. In particular, the detector 270 may detect not only a touch interaction with respect to the bezel area but also various user interactions such as a proximity interaction.

The controller 280 controls the overall operations of the user terminal device 200 using various programs stored in the storage 250.

As illustrated in FIG. 2, the controller 280 includes a random access memory (RAM) 281, a read only memory (ROM) 282, a graphic processor 283, a main central processing unit (CPU) 284, a first to nth interface 285~1285-*n*, and a bus 286. Here, the RAM 281, the ROM 282, the graphic processor 283, the main CPU 284, the first to the nth interface 285~1285-*n*, etc. may be interconnected through the bus 286.

The ROM 282 stores a set of commands for system booting. If a turn-on command is input and thus, power is supplied, the main CPU 284 copies operating system (O/S) stored in the storage 250 in the RAM 281 according to a command stored in the ROM 282, and boots a system by executing the O/S. When the booting is completed, the main CPU 284 copies various application programs stored in the storage 250 in the RAM 281, and executes the application programs copied in the RAM 281 to perform various operations.

The graphic processor 283 generates a screen including various objects such as an icon, an image, a text, etc. using a computing unit (not shown) and a rendering unit (not shown). The computing unit computes property values such as coordinates, shape, size, and color of each object to be displayed according to the layout of the screen using a control command received from an input unit. The rendering unit generates a screen with various layouts including objects based on the property values computed by the computing unit. The screen generated by the rendering unit is displayed in a display area of the touch screen 230.

The main CPU 284 accesses the storage 250, and performs booting using an O/S stored in the storage 250. In addition, the main CPU 284 performs various operations using various programs, contents, data, etc. which are stored in the storage 250.

The first to the nth interface 285-1 to 285-*n* are connected to the above-described various elements. One of the interface may be network interface which is connected to an external apparatus via network.

In particular, if a user interaction is detected on the bezel area of the user terminal device 200 while the keyboard UI is displayed on the touch screen 230, the controller 280 may change the properties of the keyboard UI according to the user interaction which is detected on the bezel area. In this case, the properties of the keyboard UI may include at least one of the size of a text key included in the keyboard UI, the transparency of the keyboard UI, the input mode of the keyboard UI, and the exposure area of the keyboard UI.

According to an embodiment, if a touch interaction of touching one point on the bezel area which is located at the first side of the bezel area of the user terminal device 200 is detected, the controller 280 may control the touch screen 230 to enlarge and display an area corresponding to the touched point of the keyboard UI.

FIGS. 3A, 3B, 3C, 4A, 4B, 4C, 5A, 5B, 5C, 5D, 6A, 6B, 7A, 7B, 8A, 8B, 8C, 8D, 9A, 9B, 9C, 9D, 10A, 10B, 10C, 10D, 10E, 10F, 11A, 11B, 11C, 11D, 12A, 12B, 12C, 12D, 12E, 13A, 13B, 13C, 14A, 14B, 15A, 15B, 15C, 16A, 16B, and 16C are views provided to explain various embodiments of controlling a keyboard user UI based on a user interaction of a bezel area according to an embodiment of the present disclosure.

Figure 3A:
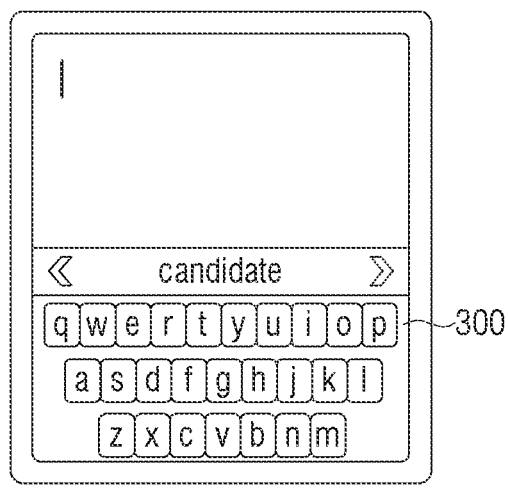
FIGS. 3A, 3B, 3C, 4A, 4B, 4C, 5A, 5B, 5C, 5D, 6A, 6B, 7A, 7B, 8A, 8B, 8C, 8D, 9A, 9B, 9C, 9D, 10A, 10B, 10C, 10D, 10E, 10F, 11A, 11B, 11C, 11D, 12A, 12B, 12C, 12D, 12E, 13A, 13B, 13C, 14A, 14B, 15A, 15B, 15C, 16A, 16B, and 16C are views provided to explain various embodiments of controlling a keyboard user interface (UI) based on a user interaction of a bezel area according to an embodiment of the present disclosure.
Figure 3B:
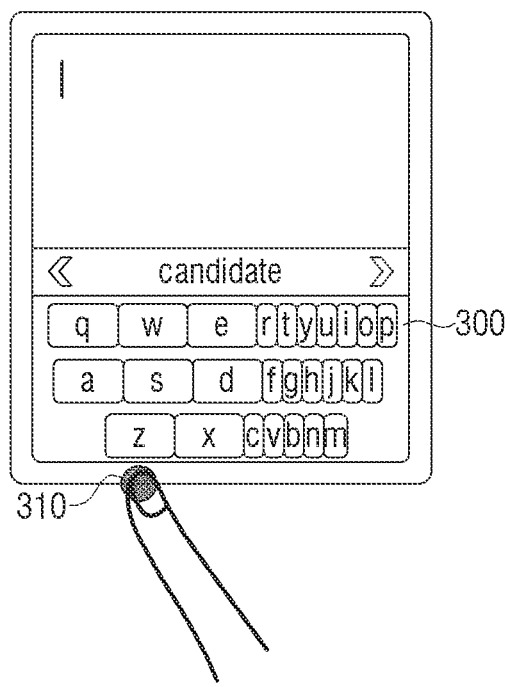

Specifically, if a touch interaction 310 of touching a left point of the bezel area which is located at a lower side of the user terminal device 200 is detected as illustrated in FIG. 3B while a keyboard UI 300 including text keys in the same size is displayed as illustrated in FIG. 3A, the controller 280 may control the touch screen 230 to enlarge and display the text keys (q, w, e, a, s, d, z, x) on the left area in the keyboard UI 300 where the touch interaction 310 is detected as illustrated in FIG. 3B.

Figure 3C:
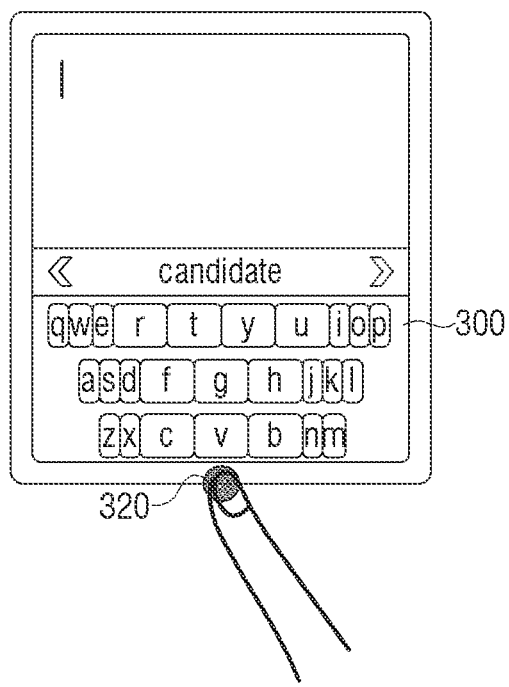

In addition, if a touch interaction 320 of touching a middle point of the bezel area which is located at a lower side of the user terminal device 200 is detected as illustrated in FIG. 3C while a keyboard UI 300 including text keys in the same size is displayed as illustrated in FIG. 3A, the controller 280 may control the touch screen 230 to enlarge and display the text keys (q, w, e, a, s, d, z, x) on the middle area in the keyboard UI 300 where the touch interaction 320 is detected as illustrated in FIG. 3C.

In other words, the controller 280 may divide text keys into three groups according to the location of the text keys included in the keyboard UI. If a left point of the bezel area is touched, the controller 280 may control the touch screen 230 to enlarge the first group (q, w, e, a, s, d, z, x), if a left point of the bezel area is touched, the controller 280 may control the touch screen 230 to enlarge the second group (r, t, y, u, f, g, h, c, v, b), and if a left point of the bezel area is touched, the controller 280 may control the touch screen 230 to enlarge the first group (i, o, p, j, k, l, n, m).

Meanwhile, in the above embodiment, the text keys included in the keyboard UI 300 is divided into three groups, but this is only an example. The text keys may be divided into two or four groups.

As described above, by enlarging specific text keys of the keyboard UI through a touch interaction of touching a specific point of the bezel area, a user may select the text keys more easily.

According to another embodiment, if a drag interaction of touching the bezel area which is located at the second side of the bezel area of the user terminal device 200 and dragging the touched area is detected, the controller 280 may control the touch screen 230 to adjust the transparency of the keyboard UI according to the direction of the drag interaction.

Figure 4A:
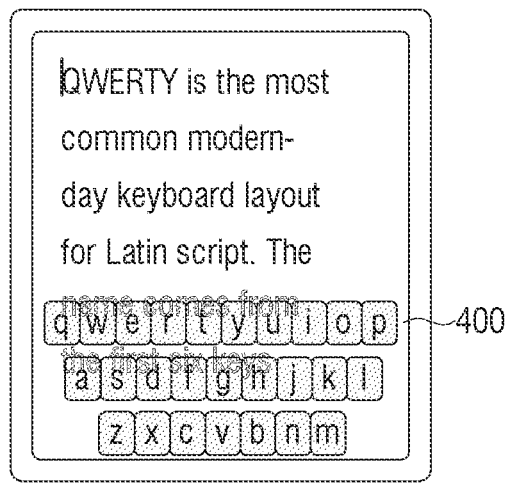
Figure 4B:
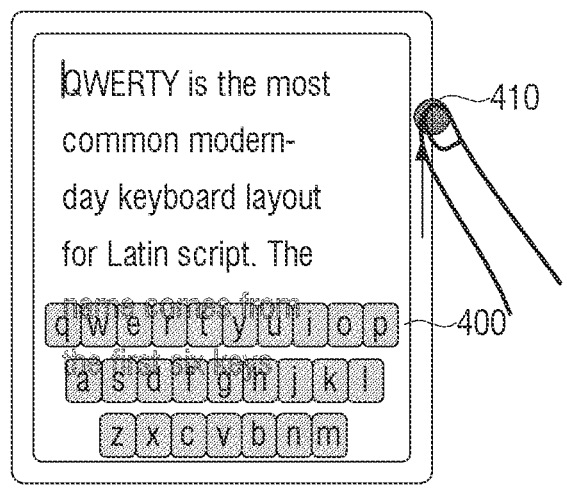

Specifically, if a drag interaction 410 of touching one point of the bezel area which is located at a right side of the user terminal device 200 and dragging the touched point in the upper direction is detected as illustrated in FIG. 4B while texts input from a user are displayed together with a keyboard UI 400 including text keys in the same size are displayed as illustrated in FIG. 4A, the controller 280 may control the touch screen 230 to reduce the transparency of the keyboard UI 400 so that the texts which are overlapped and displayed with the keyboard UI 400 cannot be seen as illustrated in FIG. 4B.

Figure 4C:
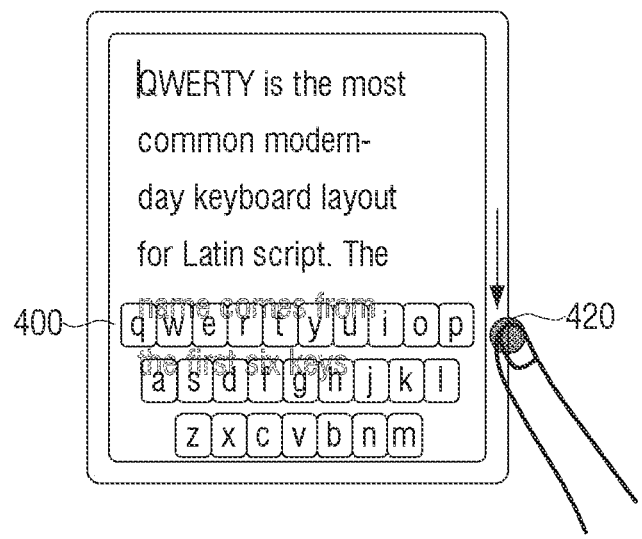

In addition, if a drag interaction 420 of touching one point of the bezel area which is located at a right side of the user terminal device 200 and dragging the touched point in the lower direction is detected as illustrated in FIG. 4C while texts input from a user are displayed together with a keyboard UI 400 including text keys in the same size are displayed as illustrated in FIG. 4A, the controller 280 may control the touch screen 230 to increase the transparency of the keyboard UI 400 so that the texts which are overlapped and displayed with the keyboard UI 400 can be seen as illustrated in FIG. 4C.

In particular, if texts and the keyboard UI 400 are displayed simultaneously using the small touch screen 230, it is impossible to display many texts at once. As described above, by adjusting the transparency of the keyboard UI 400 using a user interaction with respect to the bezel area, a user may view a large number of texts.

According to another embodiment, if a drag interaction of touching two points of the bezel area which are located at two sides facing each other of the bezel area of the user terminal device 200 and dragging the touched two points of the bezel area in the same direction is detected, the controller 280 may change the input mode of the keyboard UI according to the direction of the drag interaction.

Figure 5A:
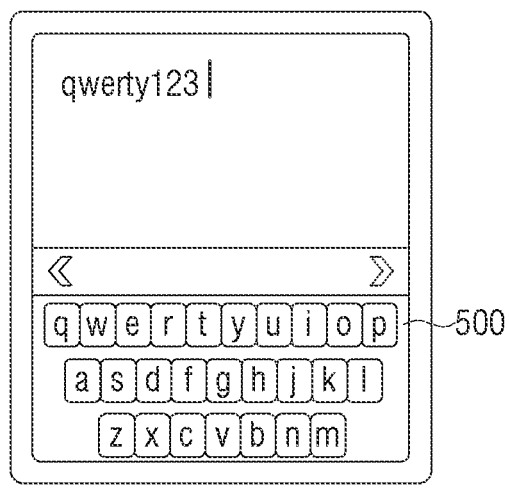
Figure 5B:
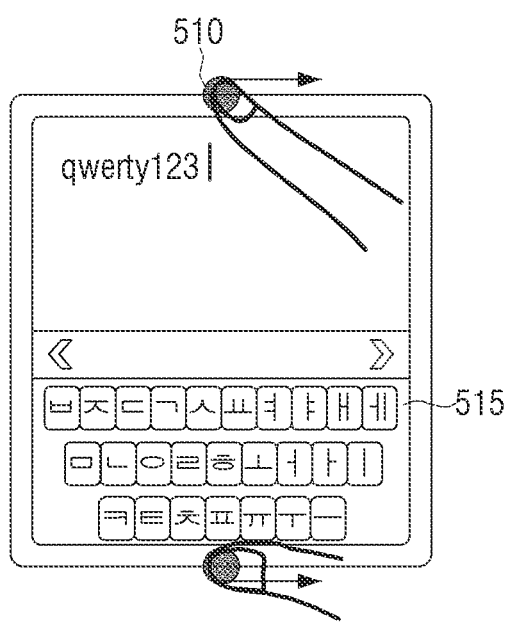
Figure 5C:
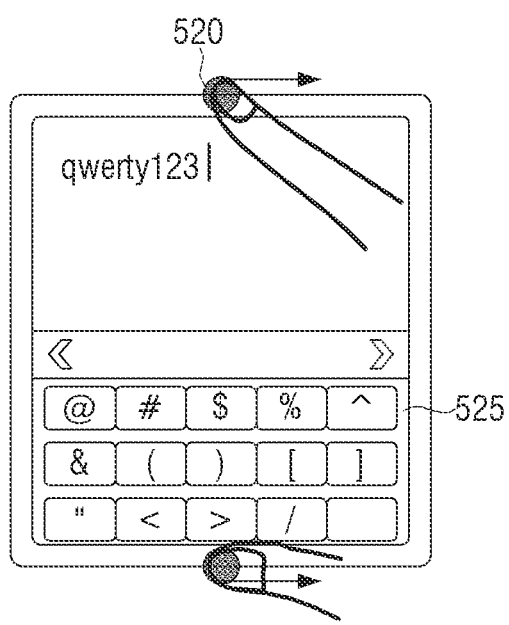
Figure 5D:
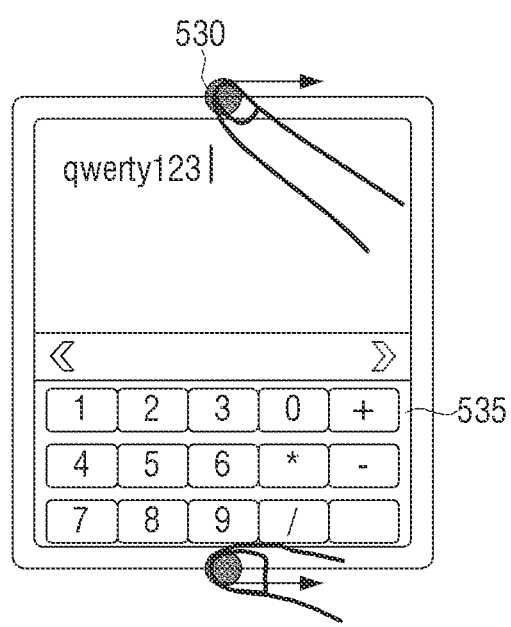

Specifically, if a drag interaction 510 of touching two points of the bezel area which are located at an upper side and a lower side and dragging the touched two points of the bezel area in the right direction is detected as illustrated in FIG. 5B while a keyboard UI 500 in an English input mode is displayed on the touch screen 230 as illustrated in FIG. 5A, the controller 280 may control the touch screen 230 to display a keyboard UI 515 in a Korean input mode as illustrated in FIG. 5B. If a drag interaction 520 of touching two points of the bezel area which are located at an upper side and a lower side and dragging the touched two points of the bezel area in the right direction is detected as illustrated in FIG. 5B while the keyboard UI 515 in the Korean input mode is displayed on the touch screen 230 as illustrated in FIG. 5B, the controller 280 may control the touch screen 230 to display a keyboard UI 525 in a special text input mode as illustrated in FIG. 5C. If a drag interaction 530 of touching two points of the bezel area which are located at an upper side and a lower side and dragging the touched two points of the bezel area in the right direction is detected as illustrated in FIG. 5C while the keyboard UI 525 in the special text input mode is displayed on the touch screen 230 as illustrated in FIG. 5C, the controller 280 may control the touch screen 230 to display a keyboard UI 535 in a number input mode as illustrated in FIG. 5D.

In other words, if one point of an upper side and a lower side of the bezel area is touched and the touched points are dragged in the right direction, the controller 280 may change the input mode in the order of English input mode→Korean input mode→special text input mode→number input mode. In addition, if one point of an upper side and a lower side of the bezel area is touched and the touched points are dragged in the left direction, the controller 280 may change the input mode in the order of number input mode→special text input mode→Korean input mode→English input mode.

Meanwhile, in the above embodiment, the input mode of the keyboard UI is one of English input mode, Korean input mode, special text input mode, and number input mode, but this is only an example. The input mode may include other input modes (for example, Japanese input mode, special key input mode, etc.).

The order of changing the input modes in the above description is only an example, and the input modes may be changed in other orders.

As described above, by changing the input modes according to a user interaction with respect to the bezel area, a key for changing the input modes of the keyboard UI may be removed and thus, the size of a plurality of text keys included in the keyboard UI may be enlarged.

According to another embodiment, if a drag interaction of touching two points of the bezel area which are located at left and right sides of the bezel area of the user terminal device 200 is detected while texts area displayed on a touch screen, the controller 280 may select a text corresponding to an area where the drag interaction is detected.

Figure 6A:
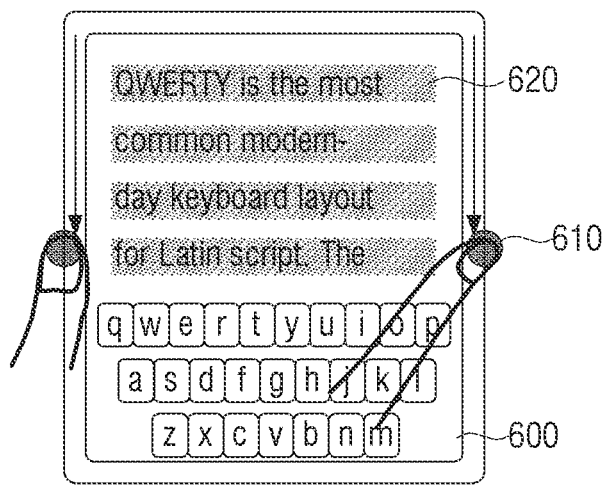
Figure 6B:
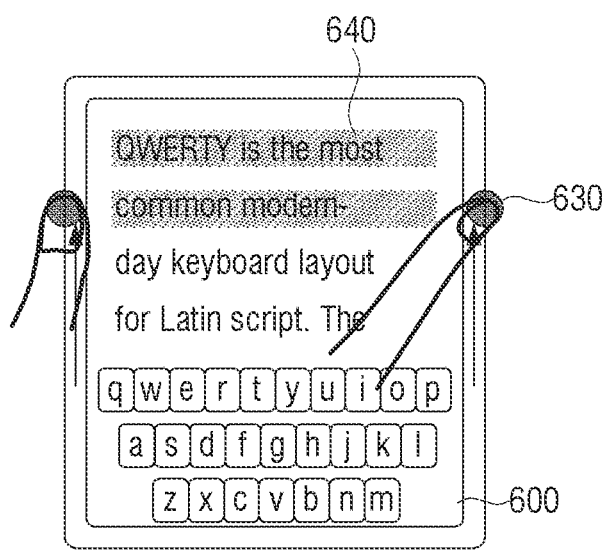

Specifically, if a drag interaction 610 of touching two points of the bezel area which are located at left and right sides of the bezel area of the user terminal device 200 and dragging the touched two points of the bezel area in the same direction is detected while texts and a keyboard UI 600 are displayed on a touch screen as illustrated in FIG. 6A, the controller 280 may select "QWERTY is the most common modern-day keyboard layout for Latin script. The name comes from" which is a text 620 corresponding to an area where the drag interaction is detected. In addition, while "QWERTY is the most common modern-day keyboard layout for Latin script. The name comes from" is selected and the touch is maintained continuously as illustrated in FIG. 6A, if a drag interaction 630 of dragging the touched points in the upper direction is detected as illustrated in FIG. 6B, the controller 280 may select "QWERTY is the most common modern-" which is a text 640 corresponding to the drag interaction as illustrated in FIG. 6B. In other words, the controller 28—may select a text which exists in an area between the start point of a drag interaction and the end point of the drag interaction.

In addition, after a text corresponding to an area where a drag interaction is detected, if a pinch interaction of touching two points of the bezel area which are located at two adjacent sides of the bezel area of the user terminal device 200 and performing a pinch-out or a pinch-in is detected, the controller 280 may copy or paste a selected text according to the pinch interaction.

Figure 7A:
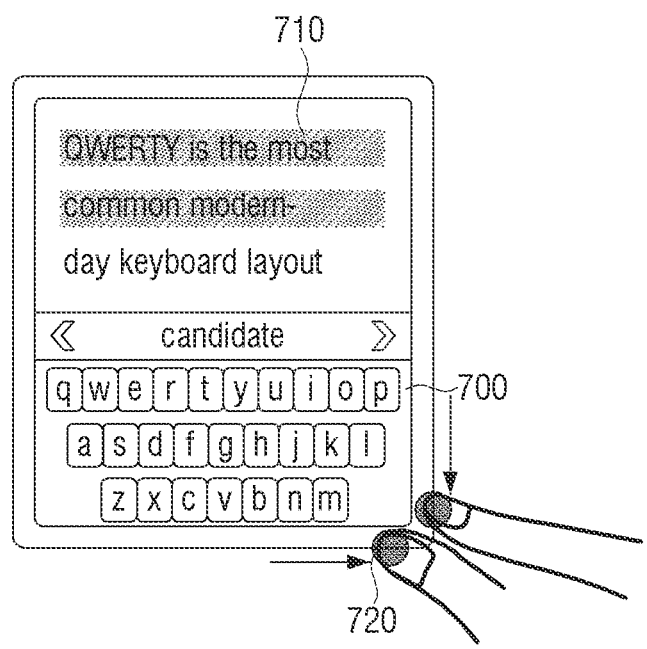

Specifically, if "QWERTY is the most common modern-" which is a text 710 selected by a drag interaction is highlighted while a keyboard UI 700 is displayed on a touch screen as illustrated in FIG. 7A and then, a pinch interaction 720 of touching one point of the bezel area which are located at lower and right sides of the bezel area of the user terminal device 200 and performing a pinch-in so that the two touched points become close is detected, the controller 280 may copy a selected text 710 and store the selected text in the storage 250 temporarily.

Figure 7B:
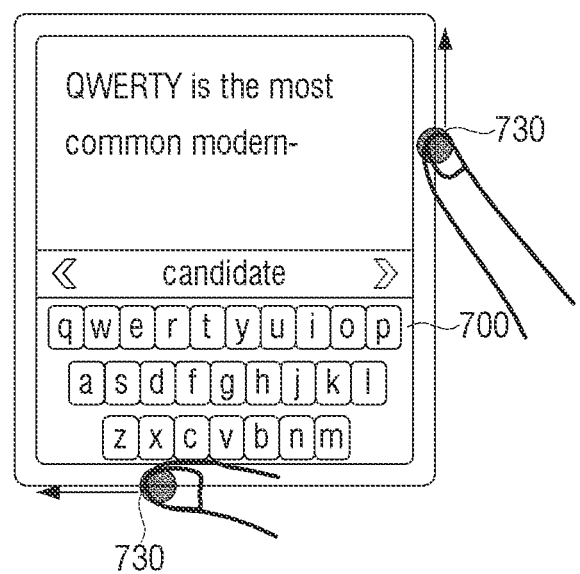

Subsequently, after a new window is displayed, if a pinch interaction 730 of touching two points of the bezel area which are located at lower and right sides of the bezel area of the user terminal device 200 and performing a pinch-out so that the two touched points become apart is detected, the controller 280 may paste the selected text 710 as illustrated in FIG. 7B.

As described above, through a multi-interaction of touching two points of the bezel area simultaneously to select, copy and paste a text, a user may edit a text more easily.

According to another embodiment, if a drag interaction of touching one point of the bezel area which is located at the first side of the bezel area of the user terminal device 200, touching one point of the bezel area which is located at the second side of the bezel area of the user terminal device 200, and dragging the touched points is detected, the controller 280 may control the touch screen 230 to change the exposure area of the keyboard UI according to the direction of the drag interaction.

Figure 8A:
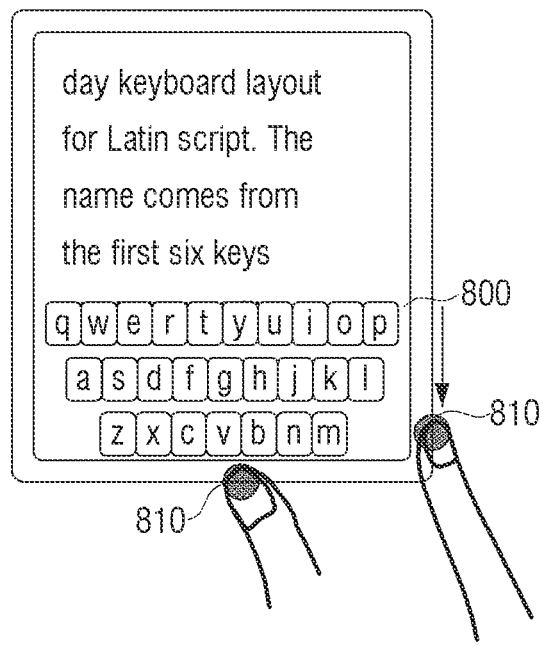
Figure 8B:
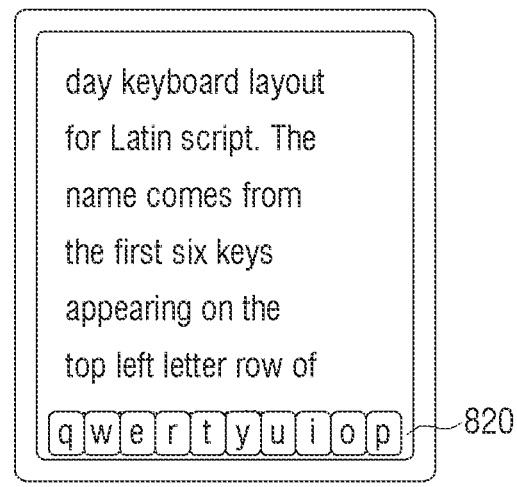

Specifically, as illustrated in FIG. 8A, if a drag interaction 810 of touching one point of the bezel area which is located at the lower side of the bezel area of the user terminal device 200, touching one point of the bezel area which is located at the right side of the bezel area of the user terminal device 200 and dragging the touched points in the lower direction is detected while a keyboard UI 800 having three rows is displayed, the controller 280, as illustrated in FIG. 8B, may control the touch screen 230 to change the keyboard UI 800 having three rows to a keyboard UI 820 having one row and display the keyboard UI 820.

Figure 8C:
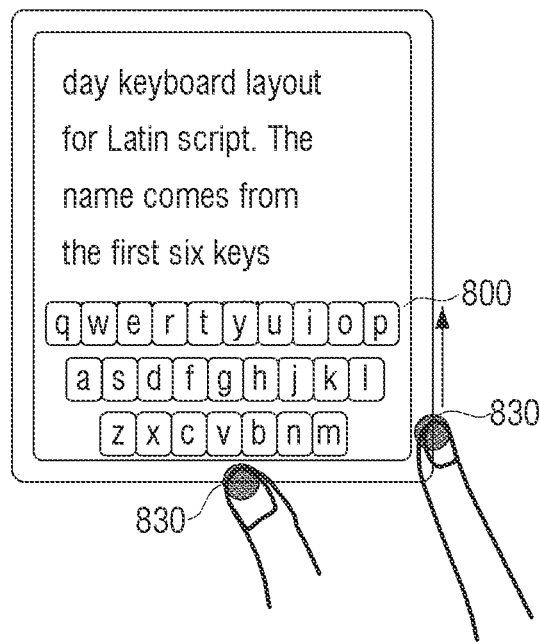
Figure 8D:
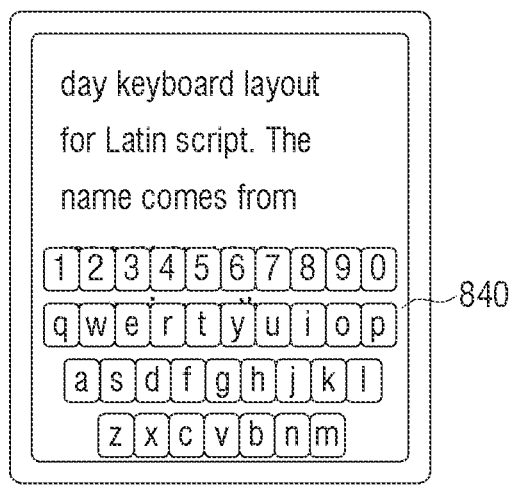

Specifically, as illustrated in FIG. 8C, if a drag interaction 830 of touching one point of the bezel area which is located at the lower side of the bezel area of the user terminal device 200, touching one point of the bezel area which is located at the right side of the bezel area of the user terminal device 200, and dragging the touched points in the upper direction is detected while the keyboard UI 800 having three rows is displayed, the controller 280, as illustrated in FIG. 8D, may control the touch screen 230 to change the keyboard UI 800 having three rows to a keyboard UI 840 having four rows including a number row and display the keyboard UI 840.

According to another example, if a pinch interaction of touching two points of the bezel area which is located at the first side of the bezel area of the user terminal device 200 and performing a pinch-out or a pinch-in is detected, the controller 280 may control the touch screen 230 to enlarge or reduce the keyboard UI according to the pinch interaction.

Figure 9A:
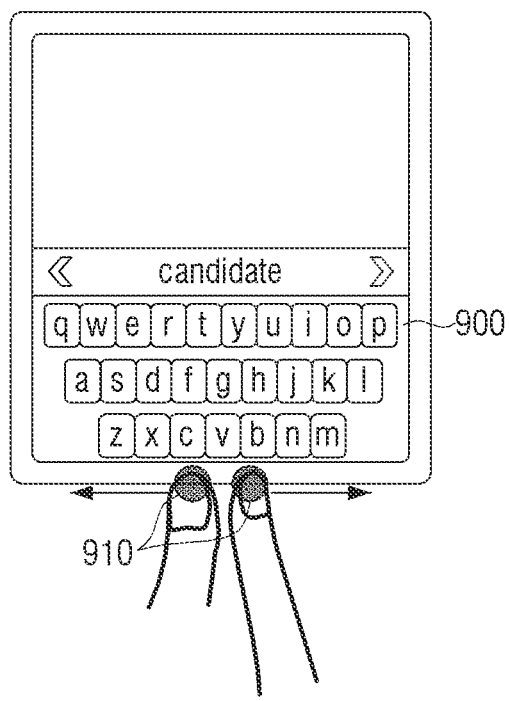
Figure 9B:
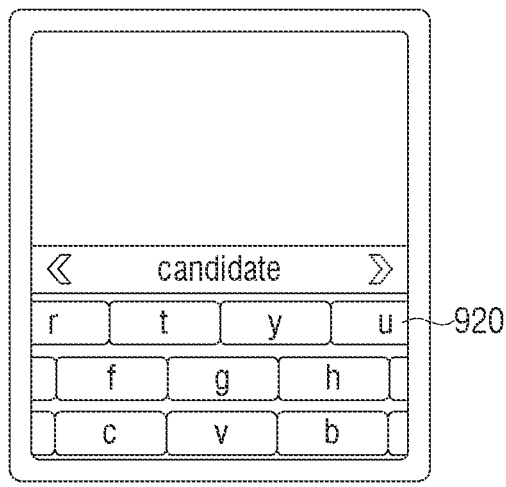

Specifically, as illustrated in FIG. 9A, if a pinch interaction 910 of touching two points of the bezel area which are located at a lower side of the bezel area and performing a pinch-out is detected while a keyboard UI 900 is displayed, the controller 280 may control the touch screen 230 to enlarge the keyboard UI 900 in a horizontal direction according to the pinch interaction 910 as illustrated in FIG. 9B. On the contrary, as illustrated in FIG. 9B, if a pinch interaction of touching two points of the bezel area which are located at a lower side of the bezel area and performing a pinch-in is detected while a keyboard 920 which is enlarged horizontally is displayed, the controller 280 may control the touch screen 230 to reduce the keyboard UI 920 in the horizontal direction and display the keyboard UI 900 of FIG. 9A according to the pinch interaction.

Figure 9C:
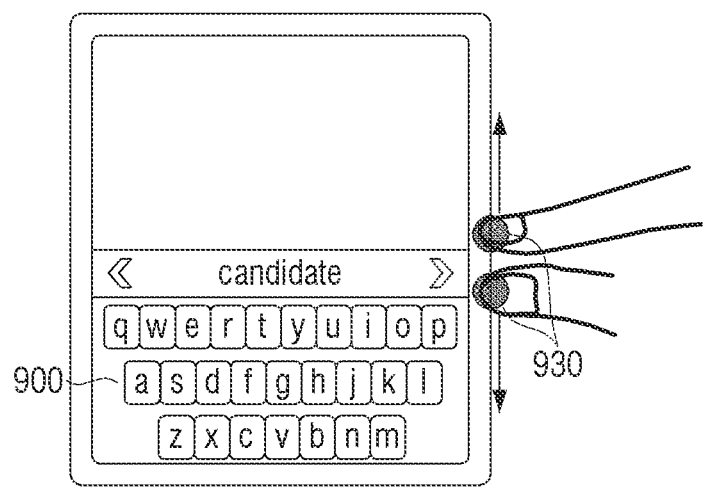
Figure 9D:
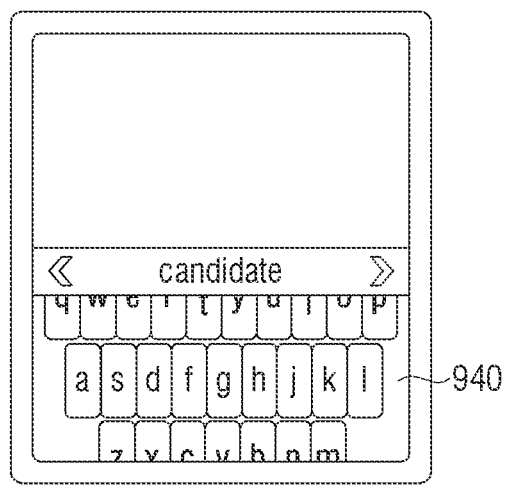

In addition, as illustrated in FIG. 9C, if a pinch interaction 930 of touching two points of the bezel area which are located at a right side of the bezel area and performing a pinch-in is detected while a keyboard UI 940 is displayed, the controller 280 may control the touch screen 230 to enlarge the keyboard UI 900 in the vertical direction according to the pinch interaction 930. On the contrary, as illustrated in FIG. 9D, if a pinch interaction 930 of touching two points of the bezel area which are located at a right side of the bezel area and performing a pinch-out is detected while the keyboard UI 940 which is enlarged in the vertical direction is displayed, the controller 280 may control the touch screen 230 to reduce the keyboard UI 940 in the vertical direction and display the keyboard UI 900 of FIG. 9C according to the pinch interaction.

In this case, the controller 290 may determine the degree of enlargement or reduction of the keyboard UI 900 according to the amount of a pinch interaction. In other words, the larger the amount of a pinch interaction, the bigger the controller 290 determines that the degree of enlargement or reduction of the keyboard UI 900, and the smaller the amount of a pinch interaction, the smaller the controller 290 determines that the degree of the enlargement or reduction of the keyboard UI 900.

Meanwhile, in FIGS. 3A to 9D, the touch screen 230 in the form of a regular square is provided, but this is only an example. The touch screen 230 in the other forms may be provided. For example, the technical feature of the present disclosure may be applied not only to a touch screen in the form of a regular square in FIG. 10A, a touch screen in the form of a rectangle in FIG. 10B, a touch screen in the form of a trapezoid in FIG. 10C, a touch screen in the form of a regular octagon in FIG. 10D, and a touch screen in the form of a circle in FIG. 10E.

Figure 10A:
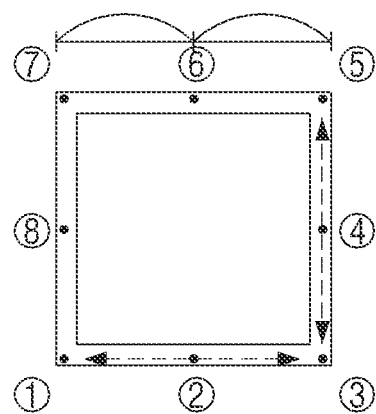
Figure 10B:
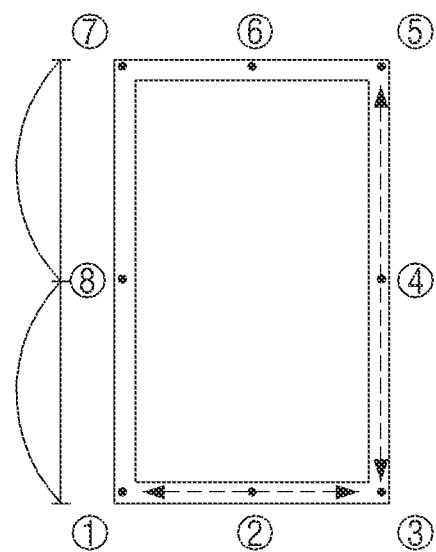
Figure 10C:
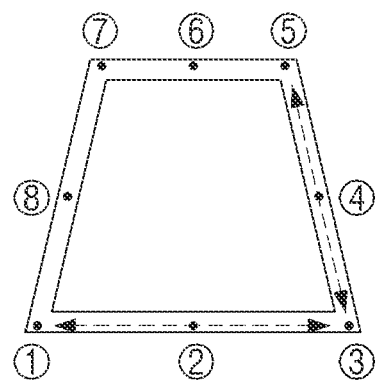
Figure 10D:
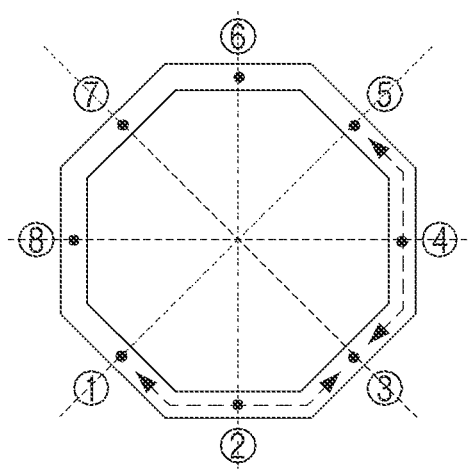
Figure 10E:
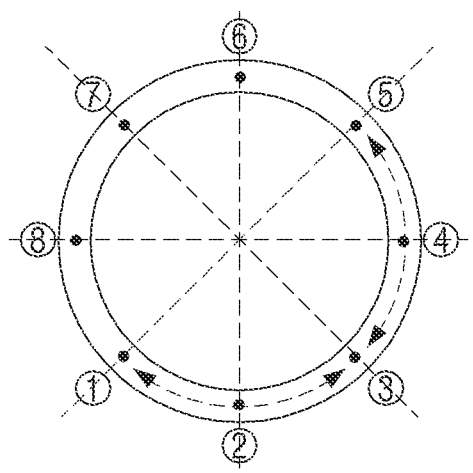

In this case, the user interactions which have been described above with reference to FIGS. 3A to 9D may be applied to a user terminal device with a touch screen in the other forms. Specifically, if a touch screen in the form of a regular square is divided by eight points as illustrated in FIG. 10A, a touch screen in other forms may also be divided by eight points as illustrated in FIGS. 10B to 10E. In addition, a user interaction which is input with reference to eight points of FIG. 10A may be mapped to a user interaction which is input with reference to eight points of FIGS. 10B to 10E. For example, if a drag interaction of touching point 1 in the lower side and dragging the touch point to point 3 passing point 2 in FIG. 10A may be regarded as the same drag interaction of touching point 1 and dragging the touch point to point 3 passing point 2 in FIGS. 10B to 10E, respectively.

Figure 10F:
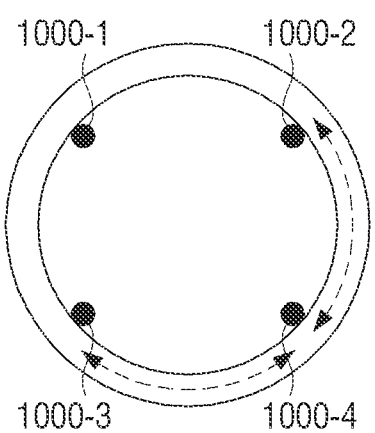

Meanwhile, as for a touch screen in the other forms, the controller 280 may control the touch screen 230 to display an indicator to divide areas. For example, if a touch screen is configured in the form of a circle, the controller 280, as illustrated in FIG. 10F, may control the touch screen 230 to display indicators 1000-1, 1000-2, 1000-3, 1000-4 at four points as illustrated in FIG. 10F.

Meanwhile, in the above-described embodiments, the properties of a keyboard UI which are changed by a user interaction with respect to the bezel area is at least one of the size of a text key, the transparency, the input mode, and the exposure area of the keyboard UI, but this is only an example. At least one of the other properties of a keyboard UI (for example, the language, the text input method, and a text display method of the keyboard UI) may be changed.

Figure 11A:
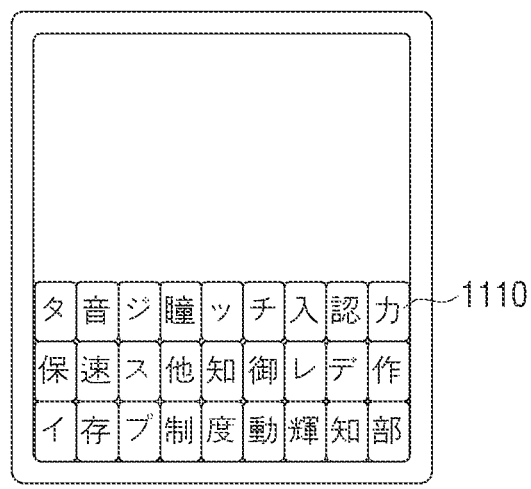
Figure 11B:
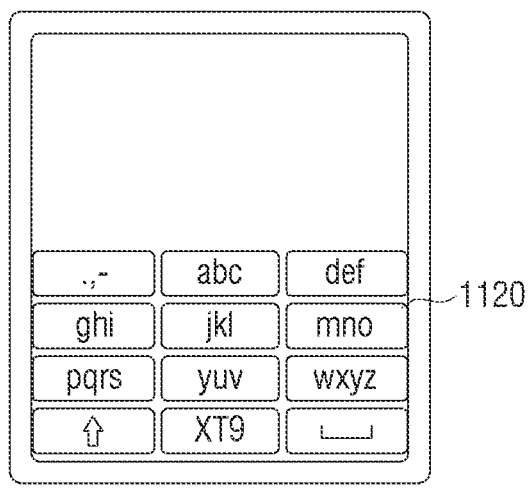
Figure 11C:
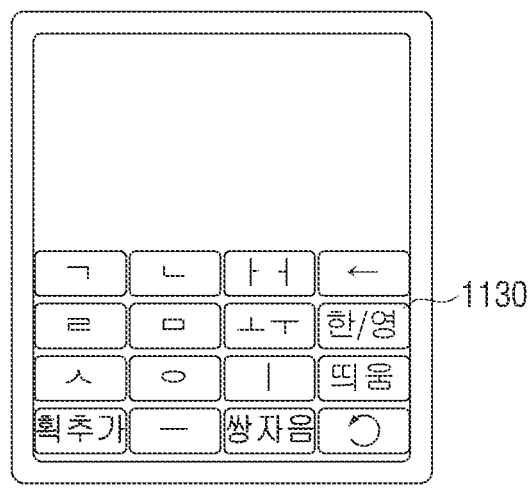
Figure 11D:
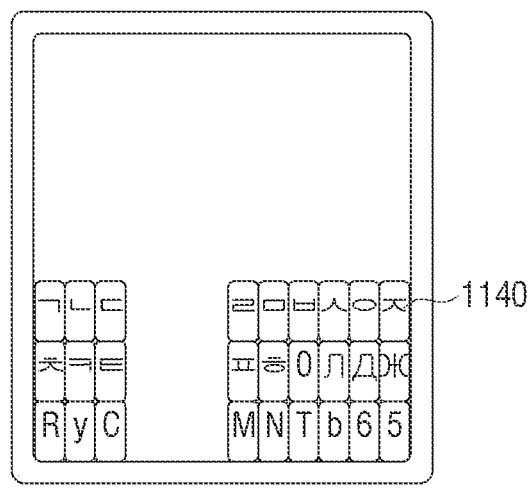

In addition, the technical concept of an embodiment may be applied regardless of the language and shape of a keyboard. For example, the technical concept of an embodiment may be applied to a keyboard 1110 which has the language other than English and Korean as illustrated in FIG. 11A, a keyboard UI 1120 which has the English input method in the form of 3×4 as illustrated in FIG. 11B, a keyboard UI 1130 which has the Korean input method of 4×4 as illustrated in FIG. 11C, and a keyboard UI 1140 which has been divided as illustrated in FIG. 11D.

Figure 12A:
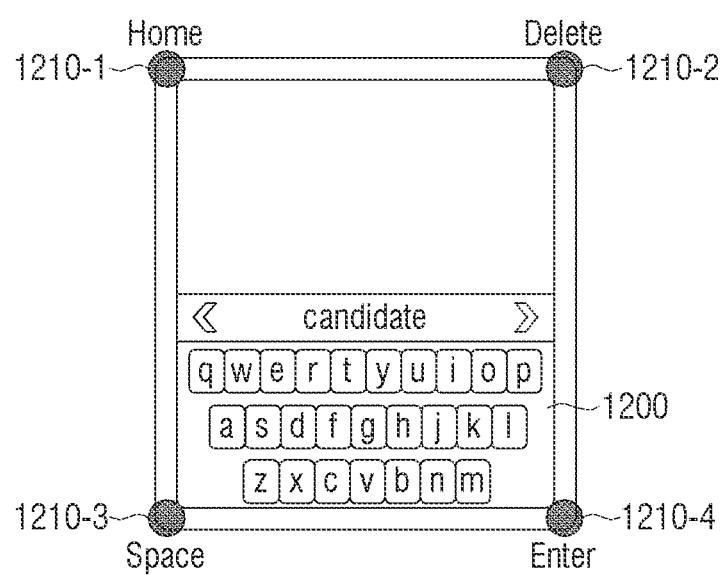

In addition, if a touch interaction of touching a predetermined area of the bezel area is detected while a keyboard UI is displayed, the controller 280 may perform a function corresponding to the predetermined area. Specifically, as illustrated in FIG. 12A, the corner areas 1210-1, 1210-2, 1210-3, 1210-4 of the bezel area may be mapped to a home screen conversion function, a deletion function, a space function, and an enter function, respectively.

Figure 12B:
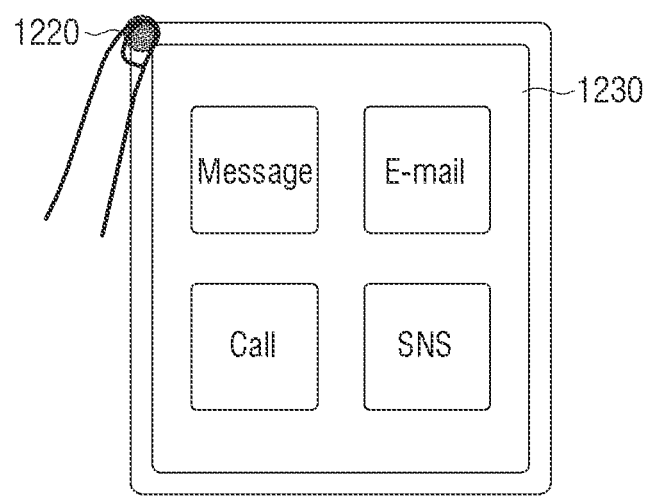
Figure 12C:
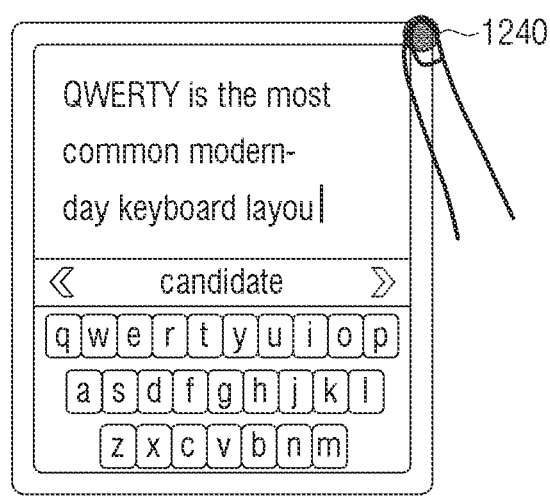
Figure 12D:
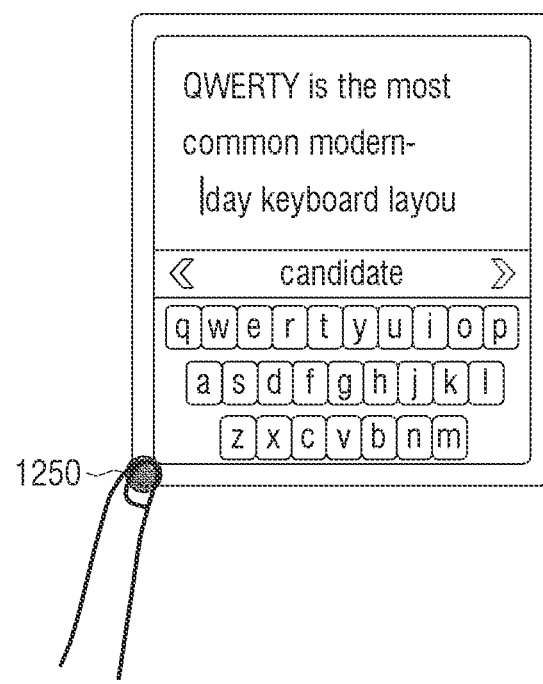

For example, as illustrated in FIG. 12B, if the first corner area 1220 of the bezel area is touched, the controller 280 may control the touch screen 230 to perform a home screen conversion function which corresponds to the first corner area 1220 and display a home screen 1230. In addition, as illustrated in FIG. 12C, if the second corner area 1240 of the bezel area is touched, the controller 280 may perform a delete function which corresponds to the second corner area 1240 and delete a text which has been input most recently. As illustrated in FIG. 12D, if the third corner area 1250 of the bezel area is touched, the controller 280 may perform a space function which corresponds to the third corner area

Figure 12E:
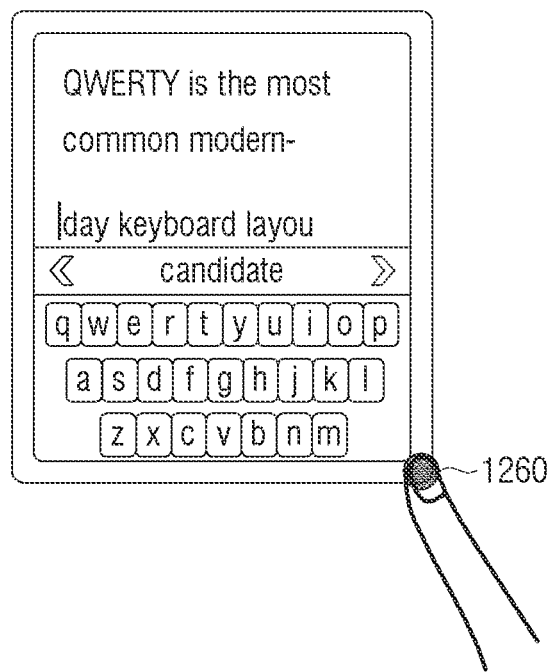

1250. Further, as illustrated in FIG. 12E, if the fourth corner area 1260 of the bezel area is touched, the controller 280 may perform an enter function which corresponds to the fourth corner area 1260.

Meanwhile, as described above, the functions corresponding to each corner area are only examples, and other functions (for example, a Korean/English conversion function, a control key function, etc.) may also be performed according to an embodiment.

Hereinafter, an embodiment where the user terminal device 200 with a touch screen in the form of a circle changes the properties of a keyboard UI will be described with reference to FIGS. 13A to 16C.

Figure 13A:
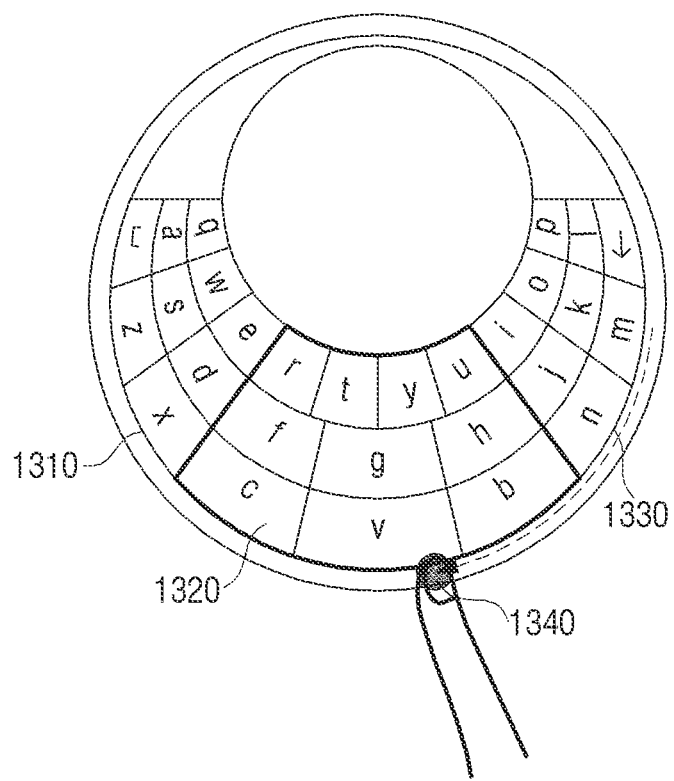

As illustrated in FIG. 13A, the touch screen 230 in the form of a circle may display a keyboard UI in the form of a circle where the text keys in the middle area larger than the text keys in the other areas. In other words, the size of the text keys in the second area 1320 may be larger than the size of the text keys in the first area 1310 and the third area 1330.

Figure 13B:
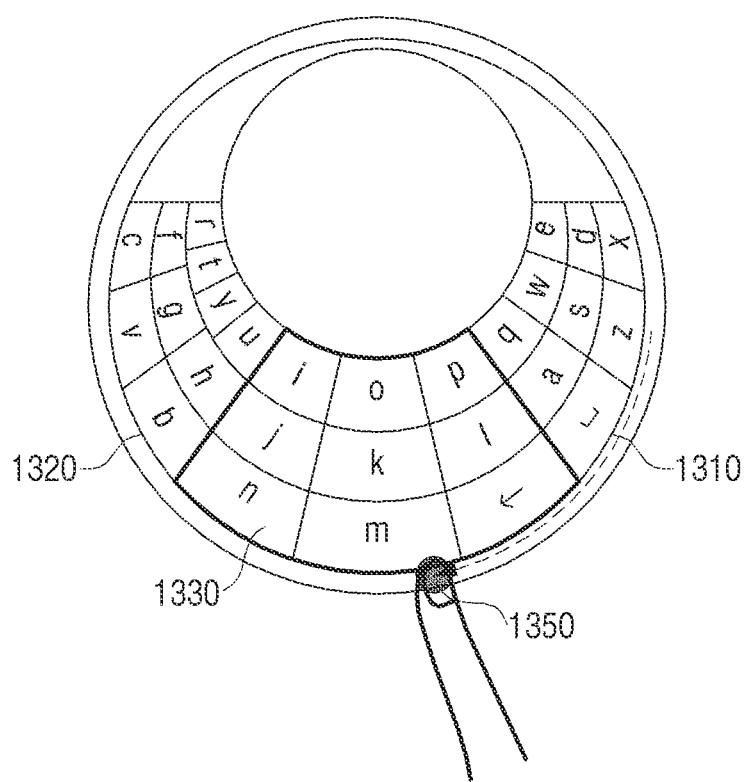

In this case, as illustrated in FIG. 13A, if a drag interaction 1340 of touching one point of an area where a keyboard UI is displayed in the bezel area and dragging the touched point in a clockwise direction is detected, the controller 280, as illustrated in FIG. 13B, may move the third area 1330 to the middle area and enlarge the text keys in the third area 1330, move the second area 1320 to the left and reduce the text keys in the second area 1320, and move the first area 1310 to the right.

Figure 13C:
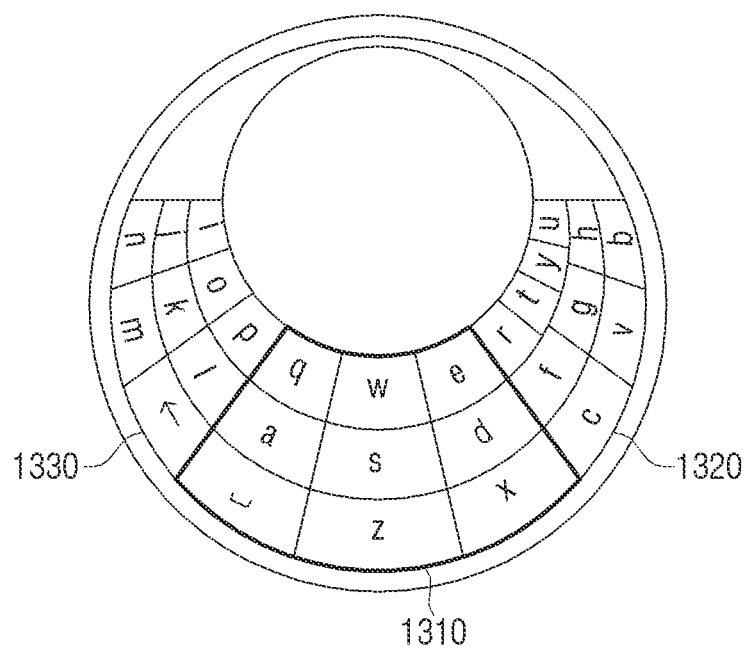

In addition, if a drag interaction 1350 of touching one point of an area where a keyboard UI is displayed in the bezel area and dragging the touched point in a clockwise direction is detected, the controller 280, as illustrated in FIG. 13C, may move the first area 1310 to the middle area and enlarge the text keys in the first area 1310, move the third area to the left and reduce the text keys in the third area 1330 again, and move the second area 1320 to the right.

As described above, through a drag interaction with respect to one point of the bezel area where a keyboard UI is displayed, the size of text keys included in the keyboard UI may be adjusted. Meanwhile, in the above embodiment, a drag interaction in a clockwise direction has been described, but this is only an example. The technical concept of an embodiment may also be applied to a drag interaction in a counterclockwise direction. When a drag interaction in a counterclockwise direction is detected, the order of changing the text keys may be reversed.

If a drag interaction of touching one point of an area where a keyboard UI is not displayed in the bezel area in the form of a circle and dragging the touched point is detected, the controller 280 may adjust the transparency of the keyboard UI according to the drag interaction.

Figure 14A:
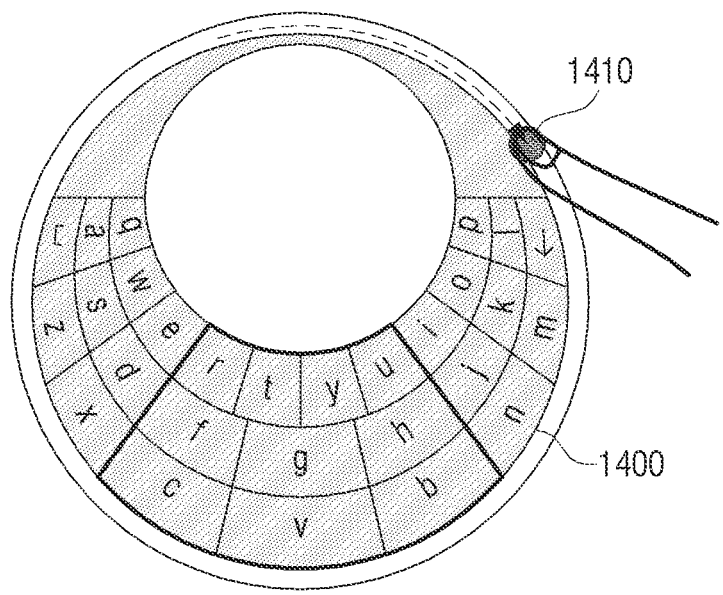
Figure 14B:
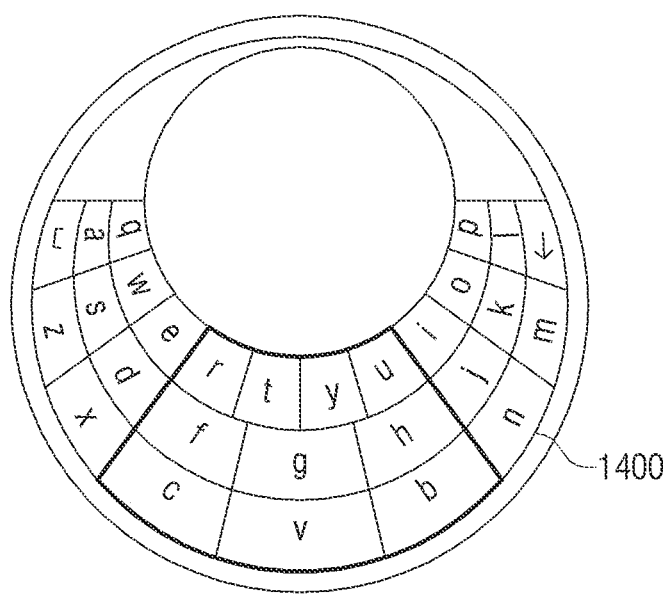

Specifically, as illustrated in FIG. 14A, if a drag interaction 1410 of touching one point of an area where a keyboard UI 1400 is not displayed in the bezel area and dragging the touched point in a clockwise direction is detected, the controller 280, as illustrated in FIG. 14B, may control the touch screen 230 to increase the transparency of the keyboard UI 1400. If the drag interaction 1340 of touching one point of an area where the keyboard UI 1400 is not displayed in the bezel area and dragging the touched point in a counterclockwise direction is detected, the controller 280 may control the touch screen 230 to reduce the transparency of the keyboard UI 1400.

In addition, if a drag interaction of touching two points in the bezel area in the form of a circle and dragging the touched points in the same direction is detected, the controller 280 may change the input mode of the keyboard UI according to the drag interaction.

Figure 15A:
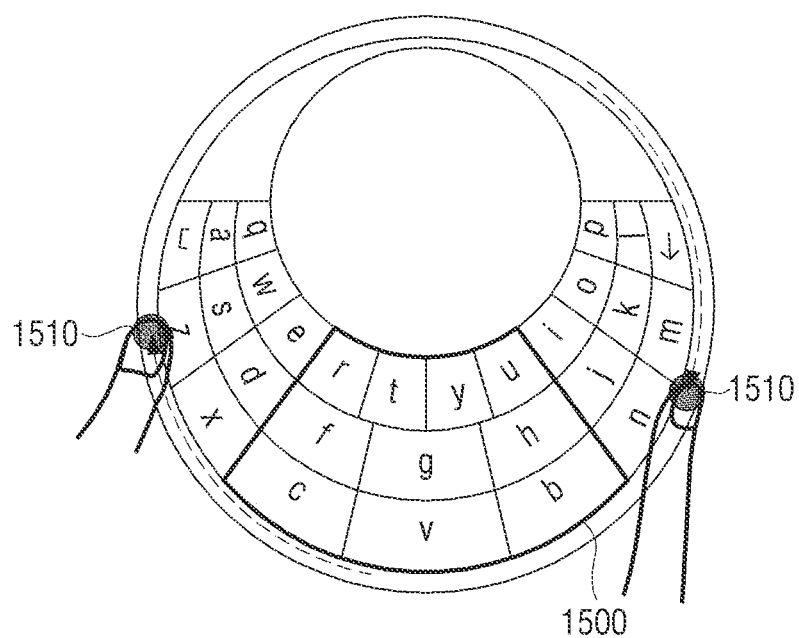
Figure 15B:
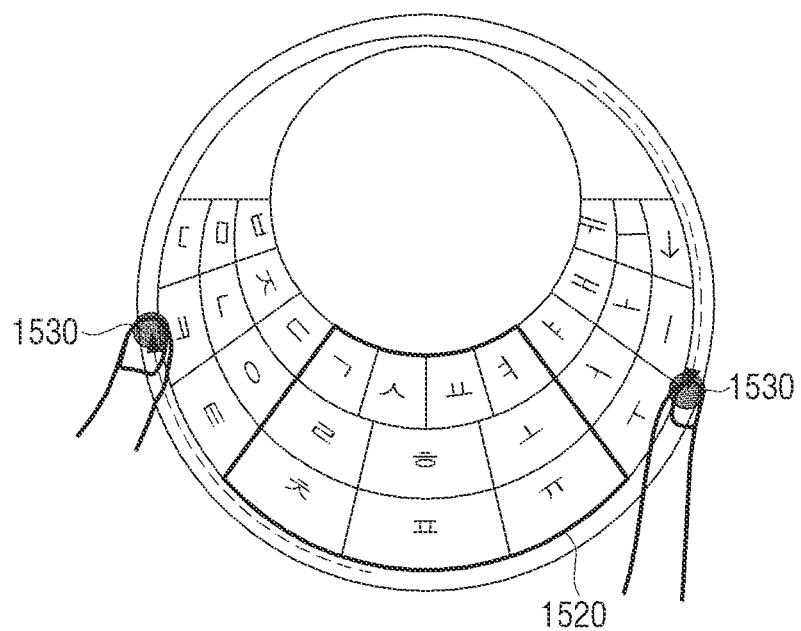
Figure 15C:
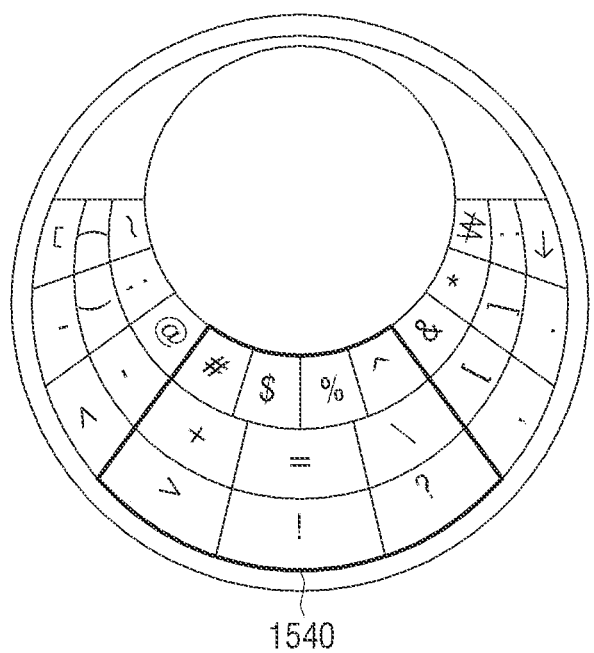

Specifically, as illustrated in FIG. 15A, if a drag interaction 1510 of touching two points of the bezel area and dragging the touched points in a clockwise direction is detected while a keyboard UI 1500 in an English input mode is displayed, the controller 280 may control the touch screen 230 to display a keyboard UI 1520 in a Korean input mode as illustrated in FIG. 15B. In addition, as illustrated in FIG. 15B, if a drag interaction 1530 of touching two points of the bezel area and dragging the touched points in a clockwise direction while the keyboard UI 1520 in the Korean input mode is displayed, the controller 280 may control the touch screen 230 to display a keyboard UI 1540 in a special text input mode as illustrated in FIG. 15C. Meanwhile, if a drag interaction of touching two points of the bezel area and dragging the touched points in a counterclockwise direction is detected, the order of changing the text input modes may be reversed.

In addition, if a pinch interaction of touching two points of the bezel area in the form of a circle and dragging the touched points in different directions is detected, the controller 280 may change the exposure of a keyboard UI according to the pinch interaction.

Figure 16A:
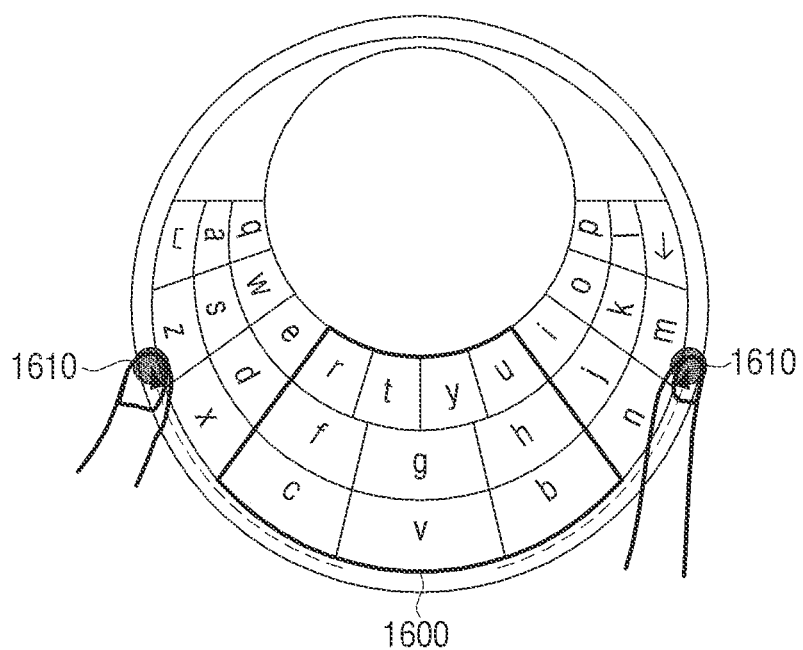
Figure 16B:
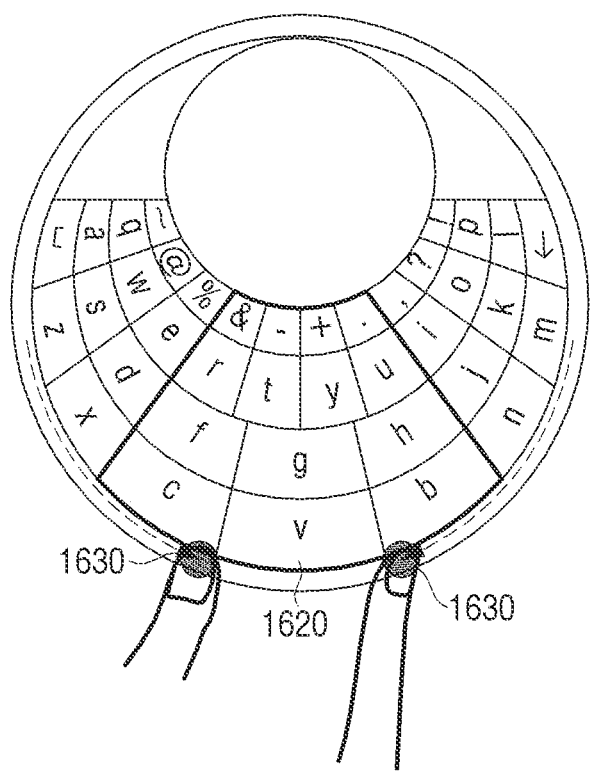
Figure 16C:
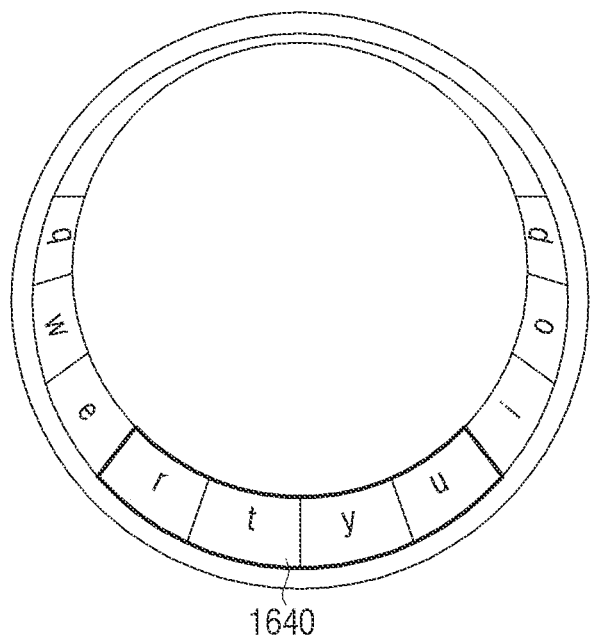

Specifically, as illustrated in FIG. 16A, if a pinch-out interaction 1610 of touching two points of the bezel area and dragging the touched points in opposite directions is detected while a keyboard UI 1600 including three rows is displayed, the controller 280 may control the touch screen 230 to display a keyboard UI 1620 including four rows as illustrated in FIG. 16B. In addition, as illustrated in FIG. 16B, if a pinch-in interaction 1630 of touching two points of the bezel area and dragging the touched points in opposite directions is detected, while the keyboard UI 1620 including four rows is displayed, the controller 280, as illustrated in FIG. 16C, may control the touch screen 230 to display a keyboard UI 1640 including one row.

Through the above-described various interactions which are input to the bezel area, a user may input texts more conveniently and swiftly.

Meanwhile, as described above, the properties of a keyboard UI which are changed in accordance with a user interaction input to the bezel area are only example, and the properties of a keyboard UI which are changed may be mapped to other user interactions.

Hereinafter, the method of controlling the user terminal device 200 will be described with reference to FIG. 17.

Figure 17:
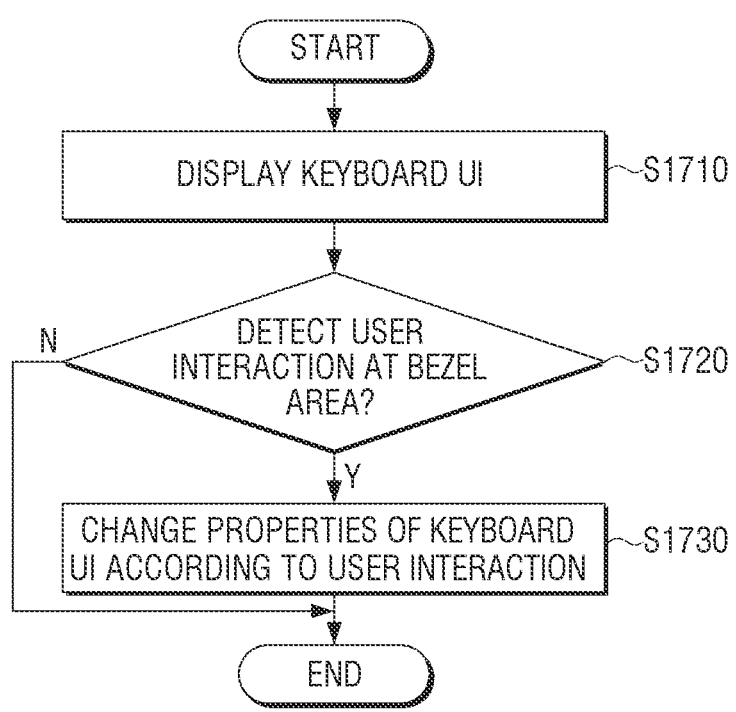
FIG. 17 is a flowchart provided to explain a method for controlling a user terminal device according to an embodiment of the present disclosure.

FIG. 17 is a flowchart provided to explain a method for controlling a user terminal device according to an embodiment of the present disclosure.

First of all, the user terminal device 100 displays a keyboard UI at operation S1710. In this case, the keyboard UI includes a plurality of text keys, and may be displayed in a small touch screen.

The user terminal device 100 determines whether a user interaction is detected in a bezel area at operation S1720.

If a user interaction is detected in the bezel area at operation S1720-Y, the user terminal device 100 changes the properties of the keyboard UI according to the user interaction at operation S1730. Here, the properties of the keyboard UI may include at least one of the size of text keys included in the keyboard UI, the transparency of the keyboard UI, the text input mode of the keyboard UI, and the exposure area of the keyboard UI.

As described above, through a user interaction with respect to the bezel area, a user may input texts more smoothly using the user terminal device 200 with a small touch screen.

Meanwhile, the method of controlling a user terminal device according to the above-described various embodiments may be realized as a program and provided in the user terminal device. Specifically, a non-transitory computer readable medium where a program including the method of controlling a user terminal device is stored is may be provided.

The non-transitory recordable medium refers to a medium which may store data semi-permanently rather than storing data for a short time, such as register, cache, memory, etc. and is readable by an apparatus. Specifically, the above-described various applications and programs may be stored and provided in a non-transitory recordable medium such as compact disc (CD), digital versatile disc (DVD), hard disk, Blu-ray disk, universal serial bus (USB), memory card, ROM, etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal device comprising:
   a touch screen configured to display a keyboard user interface (UI);
   a detector disposed at a bezel area of the user terminal device and configured to detect a type of a user interaction from among a plurality of types of user interactions; and
   at least one processor configured to:
      in response to detecting the type of the user interaction from among the plurality of types of user interactions at the bezel area of the user terminal device, change an input configuration of the keyboard UI according to the type of the user interaction detected at the bezel area,
   wherein the at least one processor determines the change of the input configuration based on the type of the user interaction at the bezel area and based on the input configuration which corresponds to the type of the user interaction from among the plurality of types of user interactions, and
   wherein the at least one processor is further configured to control the touch screen, based on a drag interaction in a first direction being sensed on the bezel area while a first keyboard UI displays a plurality of keys in a first language, to display a second keyboard UI including a plurality of keys in a second language according to the drag interaction in the first direction.

2. The user terminal device as claimed in claim 1, wherein the at least one processor is further configured to, in response to detecting a touch interaction of touching one point of the bezel area that is located at a first side of the bezel area of the user terminal device, control the touch screen to enlarge and display an area corresponding to the one point on the keyboard UI.

3. The user terminal device as claimed in claim 1, wherein the at least one processor is further configured to, in response to detecting a drag interaction of touching and dragging one point of the bezel area located at a second side of the bezel area of the user terminal device, control the touch screen to adjust transparency of the keyboard UI according to a direction of the drag interaction.

4. The user terminal device as claimed in claim 1, wherein the at least one processor is further configured to, in response to detecting a drag interaction of touching two points of the bezel area that are located at two sides of the bezel area of the user terminal device and dragging the touched two points of the bezel area in the same direction, change an input mode of the keyboard UI according to a direction of the drag interaction.

5. The user terminal device as claimed in claim 1, wherein the at least one processor is further configured to, in response to detecting a drag interaction of touching two points of the bezel area that are located at a left side and a right side of the bezel area of the user terminal device while a text is displayed on the touch screen and dragging the touched two points of the bezel area in the same direction, select a text corresponding to an area where the drag interaction is detected.

6. The user terminal device as claimed in claim 5, wherein the at least one processor is further configured to, in response to detecting a pinch interaction of touching two points of the bezel area that are located at two adjacent sides of the bezel area of the user terminal device after the text corresponding to the area where the drag interaction is detected and performing a pinch-out or a pinch-in, copy or paste the selected text according to the pinch interaction.

7. The user terminal device as claimed in claim 1, wherein the at least one processor is further configured to, in response to detecting a drag interaction of touching one point of the bezel area that is located at a first side of the bezel area of the user terminal device, and touching and dragging one point of the bezel area that is located at a second side of the bezel area of the user terminal device, control the touch screen to change an exposure area of the keyboard UI according to a direction of the drag interaction.

8. The user terminal device as claimed in claim 1, wherein the at least one processor is further configured to, in response to detecting a pinch interaction of touching two points of a bezel area that are located at a first side of the bezel area of the user terminal device and performing a pinch-out or a pinch-in, control the touch screen to enlarge or reduce the keyboard UI according to the pinch interaction.

9. The user terminal device as claimed in claim 1, wherein the at least one processor is further configured to, in response to detecting the type of the user interaction in the bezel area, change at least one of a language displayed on the keyboard UI, a text input method and a text display method according to the type of the user interaction.

10. The user terminal device as claimed in claim 1, wherein the at least one processor is further configured to, in response to detecting a touch interaction of touching a predetermined area of the bezel area while the keyboard UI is displayed, perform a function corresponding to the predetermined area.

11. A method for controlling a user terminal device, the method comprising:
   displaying, by the user terminal device, a keyboard user interface (UI) on a touch screen; and
   in response to detecting a type of a user interaction from among a plurality of types of user interactions at a bezel area of the user terminal device, changing, by the user terminal device, an input configuration of the keyboard UI according to the type of the user interaction detected at the bezel area,
   wherein the change of the input configuration is determined based on the type of the user interaction at the bezel area and based on the input configuration which corresponds to the type of the user interaction from among the plurality of types of user interactions, and wherein, based on a drag interaction in a first direction being sensed on the bezel area while a first keyboard UI displays a plurality of keys in a first language, displaying a second keyboard UI including a plurality of keys in a second language according to the drag interaction in the first direction.

12. The method as claimed in claim 11, wherein the changing of the input configuration of the keyboard UI comprises, in response to detecting a touch interaction of touching one point of the bezel area that is located at a first side of the bezel area of the user terminal device, enlarging and displaying, by the user terminal device, an area corresponding to the one point on the keyboard UI.

13. The method as claimed in claim 11, wherein the changing of the input configuration of the keyboard UI comprises, in response to detecting a drag interaction of touching and dragging one point of the bezel area located at a second side of the bezel area of the user terminal device, adjusting, by the user terminal device, transparency of the keyboard UI according to a direction of the drag interaction.

14. The method as claimed in claim 11, wherein the changing of the input configuration of the keyboard UI comprises, in response to detecting a drag interaction of touching two points of the bezel area that are located at two sides of the bezel area of the user terminal device and dragging the touched two points of the bezel area in the same direction, changing, by the user terminal device, an input mode of the keyboard UI according to a direction of the drag interaction.

15. The method as claimed in claim 11, further comprising:
in response to detecting a drag interaction of touching two points of the bezel area that are located at a left side and a right side of the bezel area of the user terminal device while a text is displayed on the touch screen and dragging the touched two points of the bezel area in the same direction, selecting, by the user terminal device, a text corresponding to an area where the drag interaction is detected.

16. The method as claimed in claim 15, further comprising:
in response to detecting a pinch interaction of touching two points of the bezel area that are located at two adjacent sides of the bezel area of the user terminal device after the text corresponding to the area where the drag interaction is detected and performing a pinch-out or a pinch-in, copying or pasting, by the user terminal device, the selected text according to the pinch interaction.

17. The method as claimed in claim 11, wherein the changing of the input configuration of the keyboard UI comprises, in response to detecting a drag interaction of touching one point of the bezel area that is located at a first side of the bezel area of the user terminal device, and touching and dragging one point of the bezel area that is located at a second side of the bezel area of the user terminal device, changing, by the user terminal device, an exposure area of the keyboard UI according to a direction of the drag interaction.

18. The method as claimed in claim 11, wherein the changing of the input configuration of the keyboard UI comprises, in response to detecting a pinch interaction of touching two points of a bezel area that are located at a first side of the bezel area of the user terminal device and performing a pinch-out or a pinch-in, enlarging or reducing, by the user terminal device, the keyboard UI according to the pinch interaction.

19. The method as claimed in claim 11, wherein the changing of the input configuration of the keyboard UI comprises, in response to detecting the type of the user interaction in the bezel area, changing, by the user terminal device, at least one of a language displayed on the keyboard UI, a text input method and a text display method according to the type of the user interaction.

20. The method as claimed in claim 11, further comprising:
in response to detecting a touch interaction of touching a predetermined area of the bezel area while the keyboard UI is displayed, performing, by the user terminal device, a function corresponding to the predetermined area.

* * * * *